(12) United States Patent
Schloss et al.

(10) Patent No.: US 12,370,409 B2
(45) Date of Patent: Jul. 29, 2025

(54) ALTERNATE REALITY SYSTEM FOR A BALL SPORT

(71) Applicants: Lenny Schloss, Charleston, SC (US); Lee Wheelbarger, Fulks Run, VA (US); Robert Cantrell, Herndon, VA (US)

(72) Inventors: Lenny Schloss, Charleston, SC (US); Lee Wheelbarger, Fulks Run, VA (US); Robert Cantrell, Herndon, VA (US)

( * ) Notice: Subject to any disclaimer, the term of this patent is extended or adjusted under 35 U.S.C. 154(b) by 808 days.

(21) Appl. No.: 17/694,171

(22) Filed: Mar. 14, 2022

(65) Prior Publication Data
US 2022/0288457 A1 Sep. 15, 2022

Related U.S. Application Data

(60) Provisional application No. 63/255,673, filed on Oct. 14, 2021, provisional application No. 63/161,415, filed on Mar. 15, 2021.

(51) Int. Cl.
| | |
|---|---|
| A63B 24/00 | (2006.01) |
| A63B 69/00 | (2006.01) |
| A63B 69/38 | (2006.01) |
| A63B 71/06 | (2006.01) |

(52) U.S. Cl.
CPC ...... *A63B 24/0062* (2013.01); *A63B 69/0079* (2013.01); *A63B 69/38* (2013.01); *A63B 71/0622* (2013.01); *A63B 2024/0065* (2013.01); *A63B 2071/0638* (2013.01); *A63B 2220/35* (2013.01); *A63B 2220/51* (2013.01); *A63B 2220/803* (2013.01); *A63B 2220/806* (2013.01); *A63B 2220/836* (2013.01); *A63B 2225/50* (2013.01)

(58) Field of Classification Search
None
See application file for complete search history.

(56) References Cited

U.S. PATENT DOCUMENTS

| | | | | |
|---|---|---|---|---|
| 4,269,410 A | * | 5/1981 | Martin | A63B 69/0079 473/418 |
| 4,801,880 A | * | 1/1989 | Koike | A63B 69/00 324/178 |
| 5,011,143 A | * | 4/1991 | Jones | A63B 69/385 473/459 |

(Continued)

*Primary Examiner* — Paul A D'Agostino
(74) *Attorney, Agent, or Firm* — Robert Cantrell; Jose W. Jimenez; Jimenez Law Firm

(57) ABSTRACT

An alternate reality training system for tennis is operationally coupled to a head assembly, a stand assembly, and a vertical polymer flexible rod assembly connecting the substantially polymer head assembly to the stand assembly. The vertical polymer flexible rod assembly oscillates when a ball member held in the head assembly is hit by a racket. An alternate reality software system is adapted to synchronize with oscillations to present substantially simultaneous cues for hitting a physical ball member coupled to the head member and convert associated data to a virtual ball member adapted to visually present data from hitting the physical ball member and associated user data. Data includes variables of power, accuracy, timing, trajectory, spin, and impact sweet spot from which to calculate virtual ball flight.

20 Claims, 22 Drawing Sheets

(56) References Cited

U.S. PATENT DOCUMENTS

| | | | | |
|---|---|---|---|---|
| 5,184,816 A * | 2/1993 | Lunsford | ........... | A63B 69/0079 |
| | | | | 473/427 |
| 5,540,430 A * | 7/1996 | Nichols | .............. | A63B 69/0002 |
| | | | | 473/417 |
| 5,685,542 A * | 11/1997 | Weis | .................. | A63B 69/0091 |
| | | | | 588/1 |
| 6,056,653 A * | 5/2000 | Boldin | ................... | A63B 69/38 |
| | | | | 473/461 |
| 7,118,499 B1 * | 10/2006 | Ling | ................. | A63B 69/0091 |
| | | | | 473/459 |
| 7,186,193 B1 * | 3/2007 | McFadden, Jr. | ....... | A63B 67/10 |
| | | | | 473/459 |
| 7,214,136 B1 * | 5/2007 | Perry | ................. | A63B 69/3655 |
| | | | | 473/145 |
| D750,184 S * | 2/2016 | Gordon | ........................ | D21/698 |
| 9,956,465 B1 * | 5/2018 | Rodriguez | ......... | A63B 69/3608 |
| 10,245,495 B2 * | 4/2019 | Dagn | .................. | A63B 43/002 |
| 10,471,327 B1 * | 11/2019 | Imahata | ............. | A63B 69/0002 |
| 11,071,898 B2 * | 7/2021 | Cochran | ............. | A63B 71/023 |
| 11,607,594 B2 * | 3/2023 | Thurber | ............. | A63B 69/0091 |
| 2004/0009832 A1 * | 1/2004 | Matulek | ............. | A63B 69/0002 |
| | | | | 473/429 |
| 2005/0113193 A1 * | 5/2005 | Wardle | .................. | A63B 69/38 |
| | | | | 473/459 |
| 2009/0233736 A1 * | 9/2009 | Woods | .............. | A63B 69/0079 |
| | | | | 473/430 |
| 2013/0053188 A1 * | 2/2013 | Moore | ................... | A63B 69/38 |
| | | | | 473/423 |
| 2013/0196794 A1 * | 8/2013 | Wheelbarger | ........ | A63F 13/245 |
| | | | | 473/422 |
| 2013/0203527 A1 * | 8/2013 | LoDuca | ............. | A63B 69/0075 |
| | | | | 473/418 |
| 2014/0180451 A1 * | 6/2014 | Marty | .................... | G06V 40/23 |
| | | | | 700/91 |
| 2014/0213392 A1 * | 7/2014 | Buono | ............... | A63B 69/0079 |
| | | | | 473/429 |
| 2015/0360112 A1 * | 12/2015 | Hofmeyr | ................ | A63B 69/38 |
| | | | | 473/428 |
| 2017/0061817 A1 * | 3/2017 | Mettler May | ........ | A61B 5/1124 |
| 2017/0368439 A1 * | 12/2017 | Khazanov | .......... | A63B 24/0075 |
| 2018/0021653 A1 * | 1/2018 | Thornbrue | ......... | A63B 69/3685 |
| | | | | 473/453 |
| 2018/0353828 A1 * | 12/2018 | Otten | ................. | A63B 24/0003 |
| 2019/0076710 A1 * | 3/2019 | Ding | .................... | A63B 60/46 |
| 2019/0083872 A1 * | 3/2019 | Dunford | ............ | A63B 69/0002 |
| 2019/0209909 A1 * | 7/2019 | Thornbrue | ......... | A63B 69/3635 |
| 2019/0347956 A1 * | 11/2019 | Daga | ..................... | G16H 40/67 |
| 2019/0358511 A1 * | 11/2019 | Scott | .................. | A63B 69/0091 |

\* cited by examiner

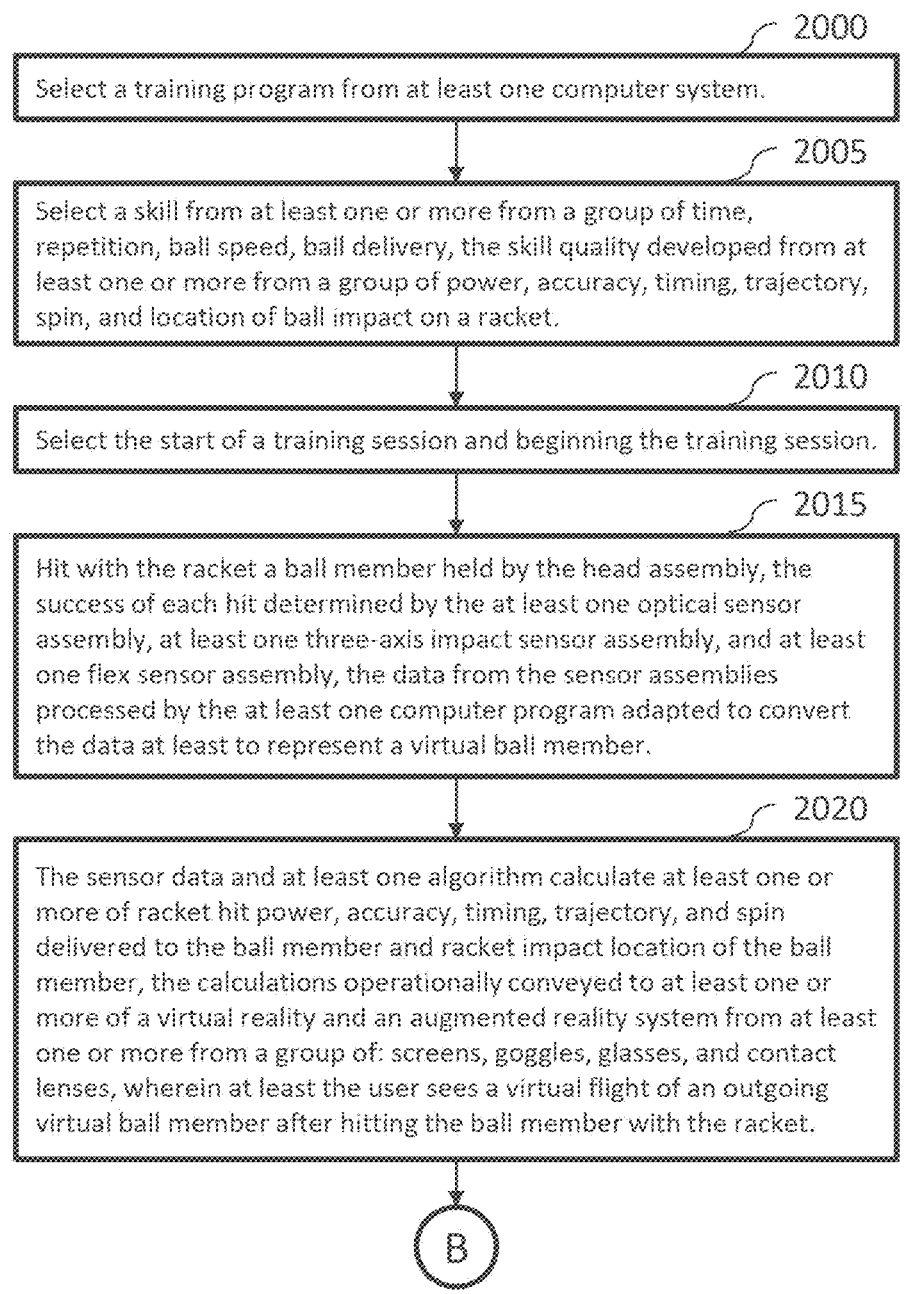

ALTERNATE REALITY SYSTEM FOR A BALL SPORT

CLAIM OF PRIORITY

This application claims priority to and the benefit of U.S. Provisional Application with Ser. No. 63/161,415, filed on Mar. 15, 2021, with the title EYE COACH AND ALTERNATE REALITY SYSTEMS, and U.S. Provisional Application with Ser. No. 63/255,673, filed on Oct. 14, 2021, with the title AN ALTERNATE REALITY SYSTEM FOR A ROD AND HEAD TENNIS BALL TRAINING SYSTEM ASSEMBLY, both of which are incorporated herein by reference in their entireties.

FIELD OF THE INVENTION

The inventive concept relates generally to an alternate reality system for a ball sport including a rod and head tennis ball training system assembly.

BACKGROUND

Currently, there are many ways to teach tennis players to properly hit a ball. One of these ways is with a coach, but this solution fails to meet the needs of the market because coaching can be expensive and may require a second person to hit or otherwise present balls to be hit by a player. A coach or player may use a machine to launch balls, but such a solution also fails to meet the needs of the market because such machines can be expensive and cumbersome, require many tennis balls for a training session, and the coach and player may spend time collecting hit balls that could otherwise be time used for training. Both coaches and ball launching machines also require a court to be effective and are not suitable for use in the home or other restricted areas. Stationary solutions where a tennis ball or its likeness are presented to a player solve some of the above problems, especially those pertaining to training in a critical zone of how a player handles a ball substantially within the last three feet of ball travel, but such solutions offer limited feedback to coaches or players about the effectiveness of hits, especially at those times when a player may wish to practice without a coach being present. Stationary solutions also lack an optimal balance between durability and desirable performance qualities desired to emulate hitting an airborne ball.

An alternate is a virtual reality, augmented reality, or mixed reality system for teaching tennis players, but these systems lack the physicality associated with hitting an actual ball. Stationary instruments for hitting a ball member may introduce physicality but lack the ability to train for timing because the physical ball member is stationary. Therefore, there exists a need in the market for an improved solution for a stationary tennis ball trainer.

SUMMARY OF THE INVENTION

The first element of the inventive concept is a head assembly for a tennis ball training system that has a polymer ball cup member with a substantially concave proximal face portion and a rim portion assembly, the tennis ball training system adapted to be operationally coupled to an alternate reality system. Other ball members may be used such as pickle balls, baseballs, golf balls, soccer, hockey, and other ball sports.

The concave proximal face portion is designed to be coupled to a ball member by the rim portion assembly of the concave proximal face portion, substantially the entirety of the concave proximal face portion supporting and contiguously abutting a first surface portion of the ball member. The rim portion assembly is comprised of at least one removable, helically threaded retaining ring member coupled to a proximal, helically threaded lip portion of the ball cup member. An interior surface of the retaining ring member is substantially contiguously abutting a second surface portion of the ball member, the sum of the first and second surface portions of the ball member greater than fifty percent of a total surface area of the ball member.

At least one optical sensor assembly is outwardly disposed along the concave proximal face portion of the ball cup member. At least one light-emitting diode (LED) member and at least one light detecting photodiode member is designed to detect a spin force from the first ball surface portion when a racket impacts the ball member. A metallic or polymer textured surface or color patterned surface or both may be disposed on the first ball surface portion to aid in spin detection. At least one three-axis impact sensor assembly is disposed in an interior portion of the ball cup member designed to detect trajectory forces imparted on the ball member when the racket impacts the ball member.

A distal surface of the ball cup member opposite the rim portion assembly is coupled by at least one helically threaded attachment member to a substantially vertical polymer flexible rod assembly, the vertical polymer flexible rod assembly bearing at least one flex sensor assembly designed to detect bending of the polymer flexible rod assembly. At least one LED light member is disposed on a top portion of the ball cup member and designed to emit at least one light color in one or more defined patterns. At least one electrical coupling member is disposed on the distal surface of the ball cup member electrically coupled to the at least one optical sensor assembly, the at least one three-axis impact sensor assembly, and the at least one LED light member. The optical sensor assembly, the three-axis impact sensor assembly, and the flex sensor assembly are electrically coupled to a computer system, the computer system having a controller through which the computer system calculates and communicates results from the sensor data by way of at least one algorithm or memory enabled program.

A second element of the inventive concept in at least one embodiment, coupled to the first element, includes a bendable shaft assembly for a head assembly of a tennis ball training system that has a vertical polymer flexible rod assembly coupled at a top end of the vertical polymer flexible rod assembly to a distal surface of the ball cup member by a retaining plate member. The retaining plate member has a concave portion on a proximal face of the retaining plate member designed, when coupled to the distal surface of the ball cup member, to secure the head assembly to the top end of the vertical polymer flexible rod assembly. The retaining plate member is coupled to a distal surface of a ball cup member by the proximal face of the retaining plate member.

At least one flex sensor assembly is designed to detect bending of the polymer flexible rod assembly. A ribbon wire member is disposed longitudinally along the length of the vertical polymer flexible rod assembly and a metal base plate member. The ribbon wire member is electrically coupled to a power source by a bottom portion of the ribbon wire member. A top portion of the ribbon wire member is coupled to an electrical coupling member on a distal surface of the ball cup member, the top portion of the ribbon wire member disposed to substantially abut the proximal face of the retaining plate member. A top portion of the metal base plate member is coupled by two or more helically threaded attachment members—the helically threaded attachment members disposed through two or more hole members disposed through the metal base plate member—to the vertical polymer flexible rod assembly and a back plate member, the helically threaded attachment members disposed through one or more attachment hole members disposed through a bottom portion of the vertical polymer flexible rod assembly and coupled to a corresponding two or more threaded hole members of the back plate member, an upper portion of the vertical flexible polymer rod member designed to oscillate from racket impact energy imparted on the ball cup member. At least one base hole member on a bottom portion of the base plate member is designed to be aligned with at least one pin member and attachment hole member of a substantially hollow vertical sleeve member of a stand assembly.

The inventive concept in this embodiment may be used for other racket sports such as racket ball and pickle ball.

The inventive concept in one embodiment uses a PATTSS flow that would be utilized within the computer system to train a student. PATTSS stands for (Power, Accuracy, Timing, Trajectory, Spin, Sweet spot.). Power is the energy delivered to a ball. Accuracy is where the player places the ball. Timing is when the player hits the ball. Trajectory is how the ball travels. Spin is the rotation the player imparts on the ball. Sweet spot is the place of impact on the racket. Additional sensors beyond those disclosed for this embodiment such as load cells may be applied to determine sweet spot, or statistical assessments may be considered based on the probability that certain results will be achieved through results obtained from the other PATTSS categories, for example, that a ball is statistically likely to behave in a desired way after a hit if the ball is consistently hit in the sweet spot. The data obtained from these sensors may have a broader range of uses beyond reporting a performance score such as to provide the statistical data needed for using the inventive concept with virtual reality or augmented reality systems. A person wearing eyewear for virtual reality or augmented reality such as goggles, glasses, or contact lenses, may see the virtual flight of a ball incoming before a hit on the ball member or outgoing after a hit on the ball member.

A third element of the inventive concept is the alternate reality system for the rod and head tennis ball training system assembly operationally coupled to the at least one rod and head assembly for a tennis ball member, the rod and head assembly having the plurality of sensor assemblies disposed thereon, the plurality of sensor assemblies adapted to detect at least one or more of impact on, impact location, acceleration, deceleration, and trajectory of at least one or more of the ball member, the head assembly, and the rod assembly, the ball member coupled to the head assembly and at least partially rotatable, sensor measurements for the rod assembly further including rod member flex and oscillation.

The alternate reality system for the rod and head tennis ball training system includes the at least one computer processor and user interface operable with the memory storage medium on which operates an alternate reality software system, the alternate reality software system including an alternate reality software and at least one sensor reading software operably coupled to at least one sensor assembly of the alternate reality system and the plurality of sensor assemblies disposed on the rod and head assembly, the sensor assemblies including at least one or more from a group of: digital cameras, optical sensors, accelerometers, global positioning systems, gyroscopes, solid state compasses, pressure sensors, radio-frequency and identification tags, the optical sensors including at least one or more of visible light spectrum sensors, infrared sensors, and thermographic sensors detecting infrared light frequencies.

The alternate reality system includes at least one or more of the plurality of sensor assemblies disposed on the rod and head assembly, at least one or more spatial sensor assemblies from the aforementioned sensor assemblies disposed to sense objects, orientations of the objects, and associated properties of the objects within a space and keyframes defined by the alternate reality system, and at least one user sensor assembly disposed on an at least one user member, the sensor assemblies operationally coupled to the at least one computer processor.

The alternate reality software system further includes at least one data software system, the data software system adapted to at least one or more of collect data, analyze data, and generate data associated with the alternate reality system, including at least one or more of the rod and head assembly, the ball member, and the at least one user of the alternate reality system.

The space defined by the alternate reality system has physical objects, virtual objects, and keyframes therein associated with time, the space circumscribing the at least one user and an associated racket member used by the at least one user, the space having a plurality of points derived along vertical, longitudinal, and latitudinal axes, the virtual objects therein having encoded properties representative of physical object counterparts of the virtual objects. The sensor reading software system detects from sensor assembly data user vectors from at least one user and the associated racket, the user vectors defining space, time, object, trajectory, and derived change of the user and the associated racket therewith, the user vectors further including orientation of eye members of the user.

The sensor reading software system further detects from sensor assembly data ball member vectors defining space, time, object, trajectory, and derived change therewith of the ball member, the ball member vectors including at least one or more from a group of: sweet spot defining where the ball member lands on racket strings, accuracy defining where the ball member lands on a court, the ball member spin defining for the ball member at least rotations per minute, trajectory of the ball member defining the pathway of ball member flight, power determined from ball member velocity, and timing associated with at least one or more of reciprocation of the rod and head assembly and at least one cue generated by the alternate reality software, the cue at least one or more of visual and audible. The alternate reality software system calculates from at least a portion of the data generated by at least one of the at least one sensor assemblies the defined space with physical and virtual objects therein, the encoded properties of the representative physical counterparts, virtual ball member vectors substantially originating from the ball member, the virtual ball member vectors defining space, time, object, trajectory, and derived change therewith of the virtual ball member and further defining object vectors, the object vectors defining within keyframes the space, time, object, trajectory, and derived change therewith of virtual objects at least one or more of actively and passively reacting to at least one or more of the virtual ball member, the encoded properties of the virtual ball member, the at least one user, and the associated racket member of the at least one user.

A wireless network is designed to transmit data to at least one or more of an at least one screen member, an at least one alternate reality wearable member, and an at least one computer display member, the wireless network further adapted to transmit data from sensor assemblies, the wireless network operationally coupled to at least one or more of the at least one computer processor and the at least one sensor assemblies.

The at least one or more of the at least one screen member, the at least one or more of the alternate reality wearable member, and the at least one or more of the computer display member are operationally coupled to the at least one computer processor, the at least one screen member, the at least one alternate reality wearable member, and the at least one computer display member adapted to display at least one or more of two-dimensional images, three-dimensional images, and statistical data for viewing by at least one or more of the user and an observer, the two-dimensional images, the three-dimensional images, and at least a portion of the statistical data.

The alternate reality system for a rod and head tennis ball training system assembly, in preferred embodiments, is synchronized with the oscillation of the rod member wherein the user times impact of the ball with synchronized cues from both the oscillation of the rod member and the alternate reality software system.

One embodiment of the alternate reality training system is for a ball sport such as tennis and has the head assembly, the stand assembly, and the vertical polymer flexible rod assembly connecting the substantially polymer head assembly to the stand assembly. The vertical polymer flexible rod is designed to oscillate when the ball member coupled to the head assembly is hit by at least one or more of a racket, rod, bat, and paddle member. The at least one computer processor and user interface is operable with a memory storage medium on which operates the alternate reality software system. The alternate reality software system is designed to synchronize with oscillations to present substantially simultaneous cues for hitting the ball member coupled to the head member and convert associated data to the virtual ball member designed to visually present data from hitting the physical ball member and associated user performance data to the screen assembly viewed by the user.

The inventive concept now will be described more fully hereinafter with reference to the accompanying drawings, which are intended to be read in conjunction with both this summary, the detailed description and any preferred and/or particular embodiments specifically discussed or otherwise disclosed. This inventive concept may, however, be embodied in many different forms and should not be construed as limited to the embodiments set forth herein; rather, these embodiments are provided by way of illustration only and so that this disclosure will be thorough, complete, and will fully convey the full scope of the inventive concept to those skilled in the art.

BRIEF DESCRIPTION OF THE DRAWINGS

FIG. 20A-20C further illustrates the representative method for using the alternate reality system for a rod and head tennis ball training system assembly.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Figure 1:
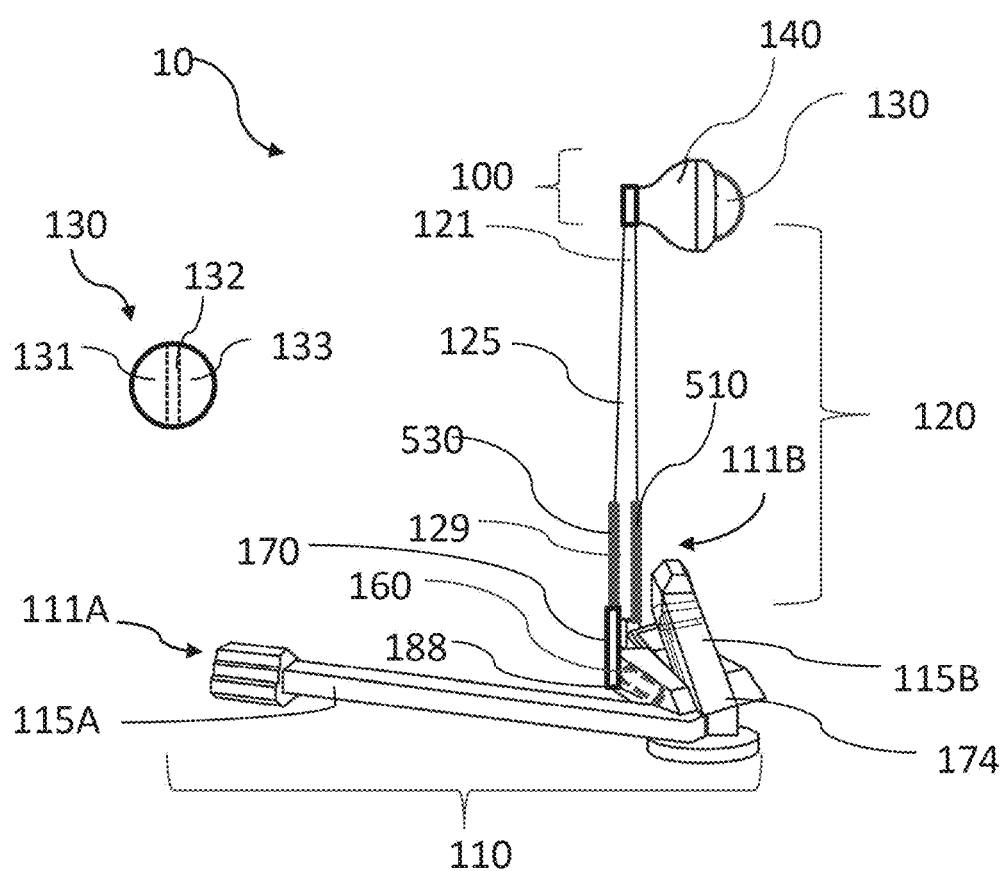
FIG. 1 illustrates a rod and head assembly for a tennis ball training system.
Figure 3:
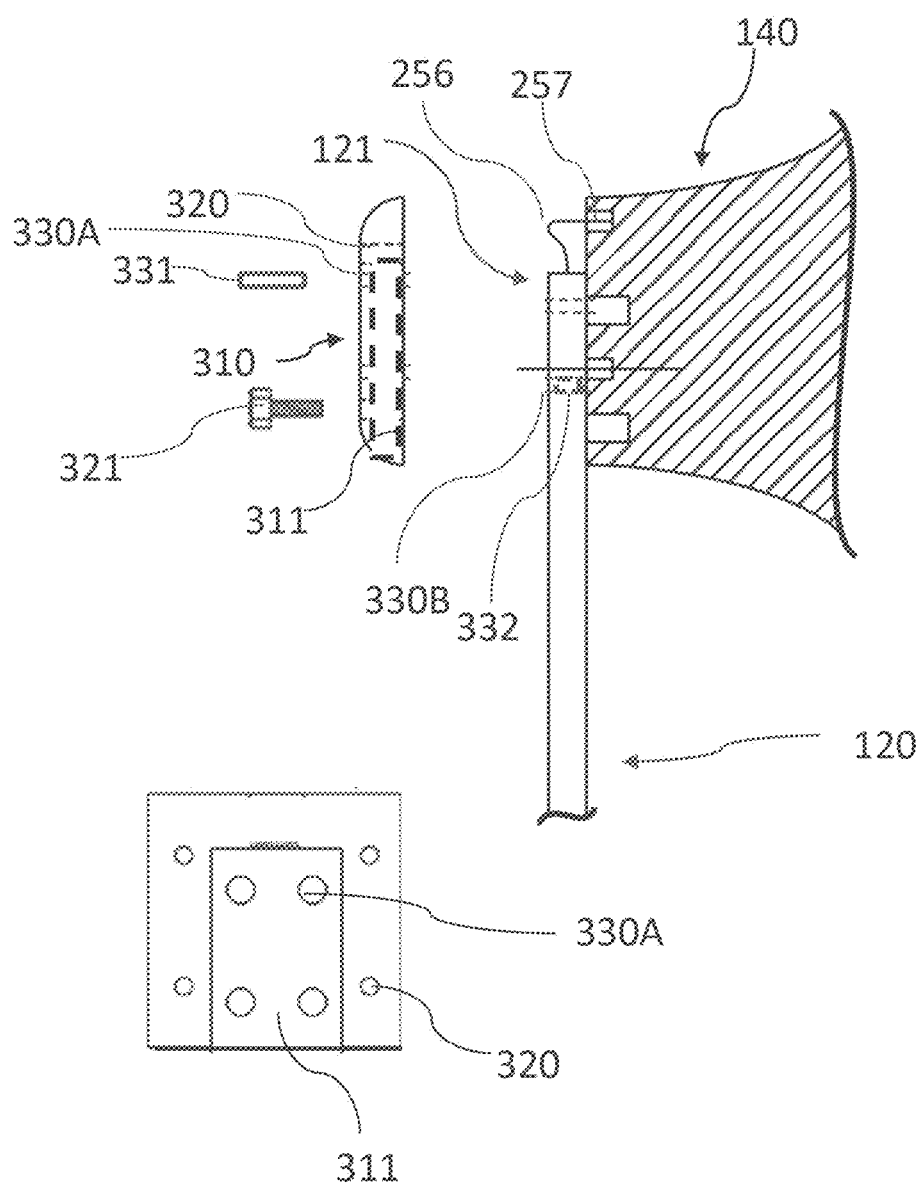
FIG. 3 illustrates a retaining plate member of the rod and head assembly for a tennis ball training system.
Figure 11:
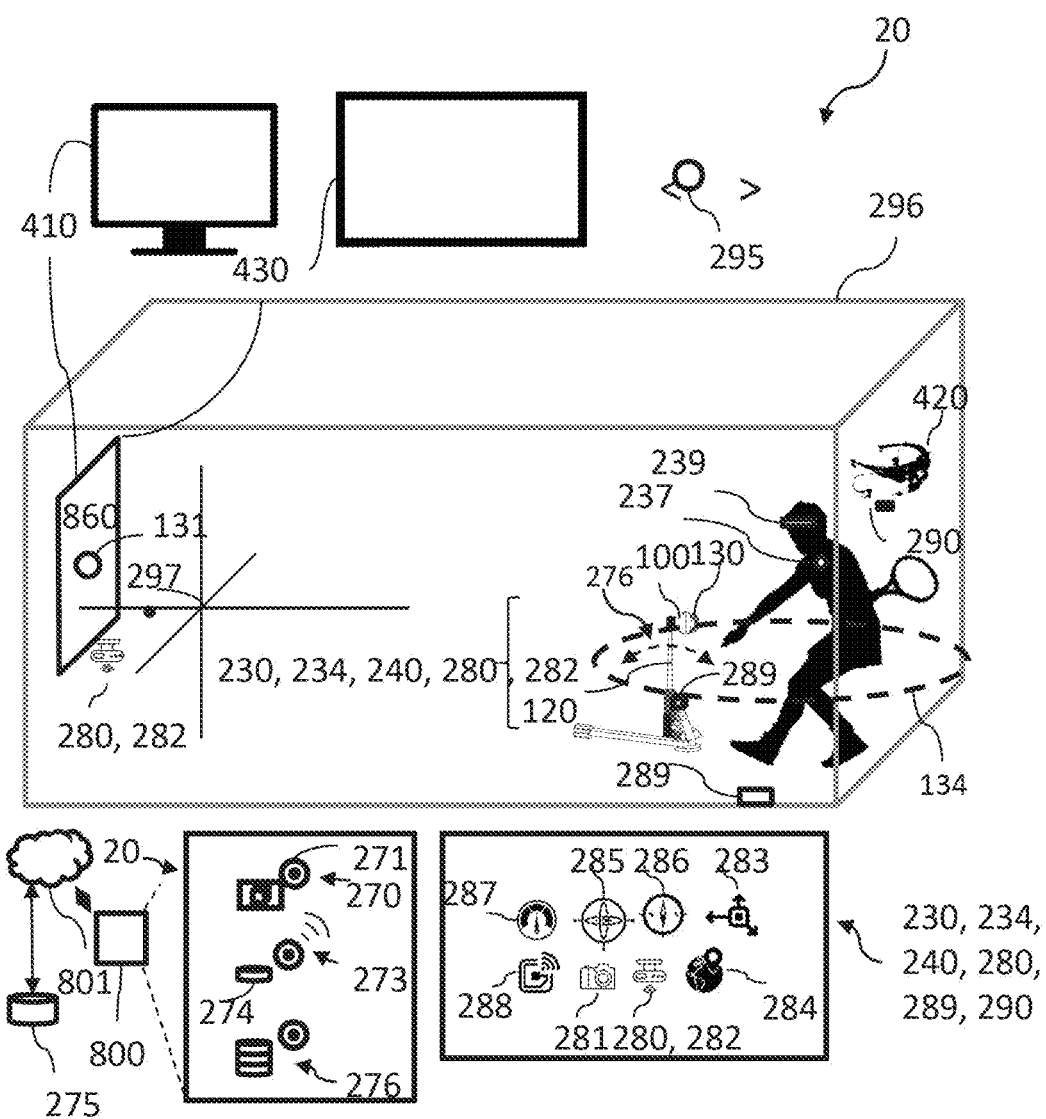
FIG. 11 illustrates a representative components view of the alternate reality system.
Figure 12:
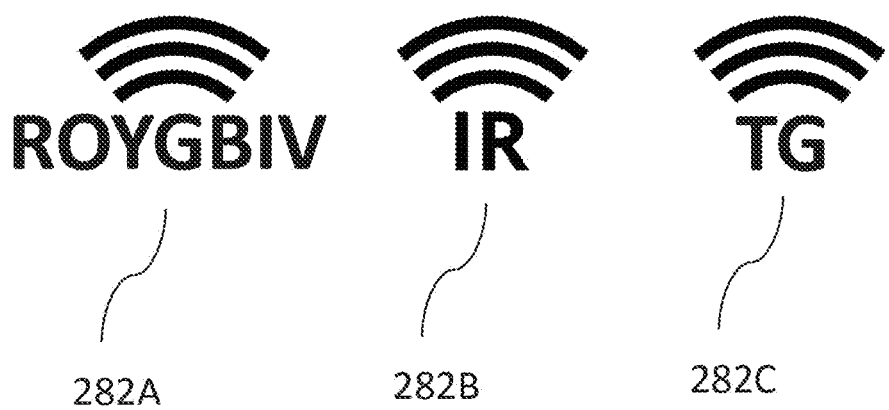
FIG. 12 illustrates optical sensor members for visible and infrared light.

Referring to the figures, FIG. 1 illustrates three components of the rod and head tennis ball training system assembly 10 in one representative embodiment used, as illustrated in FIG. 11, for an alternate reality system 20: 1) a head assembly 100, 2) a stand assembly 110, and 3) a vertical polymer flexible rod assembly 120 connecting the head assembly 100 to the stand assembly 110, the vertical polymer flexible rod assembly 120 also providing important functions for using the solution. Important is the oscillating of the flexible rod assembly 120 after a user hits a ball member 130 held by a polymer ball cup member 140 of the head assembly 100. The inventive concept allows a user to know how effectively he or she hit the ball member 130 with a racket even though the ball member 130 is retained in the head on a top end of the vertical polymer flexible rod assembly 121. With reference to FIG. 3, a concave portion on a proximal face of the retaining plate member 311 is designed, when coupled to a distal surface of the ball cup member 149, to circumscribe the top end of the vertical polymer flexible rod assembly 121, coupling the head assembly 100 to the top end of the vertical polymer flexible rod assembly 121.

Figure 2:
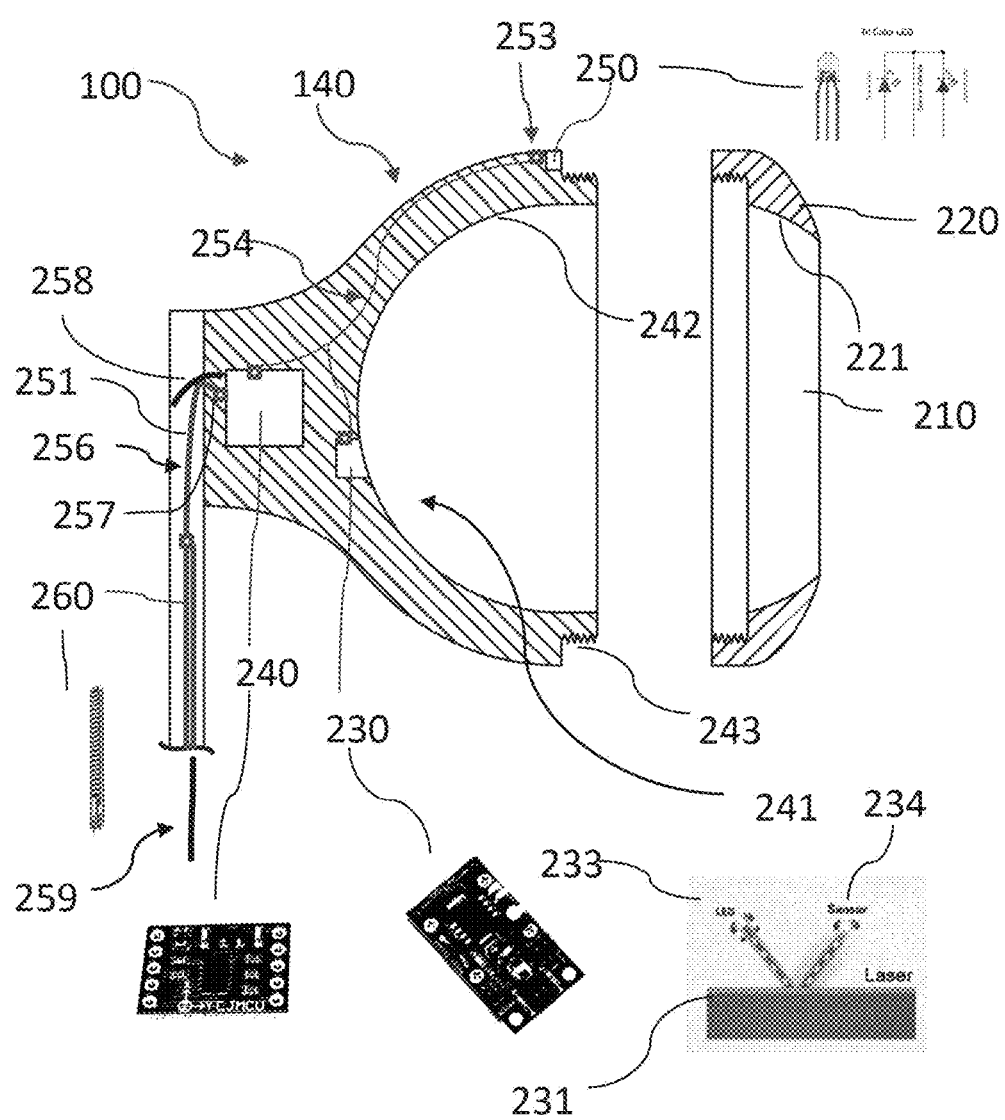
FIG. 2 illustrates a head assembly of the rod and head assembly for a tennis ball training system.

FIGS. 1 and 2 illustrate the head assembly 100, including a ball cup member 140 that is a substantially spherical, concave proximal face portion of the ball cup member 241 designed to contain approximately 60% of the ball member 130, with a surface of the concave proximal face portion of the ball cup member 242 being disposed substantially contiguous with a first surface portion of the ball member 131. In this example embodiment, the retaining ring member hole 210 is 15% smaller than the ball member 130 and is defined by a helically threaded retaining ring member 220 affixed to a helically threaded proximal lip portion of the ball cup member 243. An interior surface of the retaining ring member 221 being substantially contiguously abutting a second surface portion of the ball member 132, the sum of the first and second surface portions 131, 132 being greater than fifty percent of a total surface area of the ball member 130. The retaining ring member 220 in the example embodiment allows the approximately 60% of the ball member 130 to be inserted substantially within the ball cup member 140 and secured there. At least greater than 50% of the ball member 130 in all embodiments would be contained by the ball cup member 140. The user strikes the ball member 130 on an, in the exemplary embodiment, exposed 40% to 49% surface of the ball member 130, representing a third surface area of the ball member 133. Other surface ratios may be employed. The ball cup member 140 is made from a high-impact polycarbonate that can withstand the impact of a tennis racket, both the strings and the metal, carbon composite, or wood of the frame.

Figure 8:
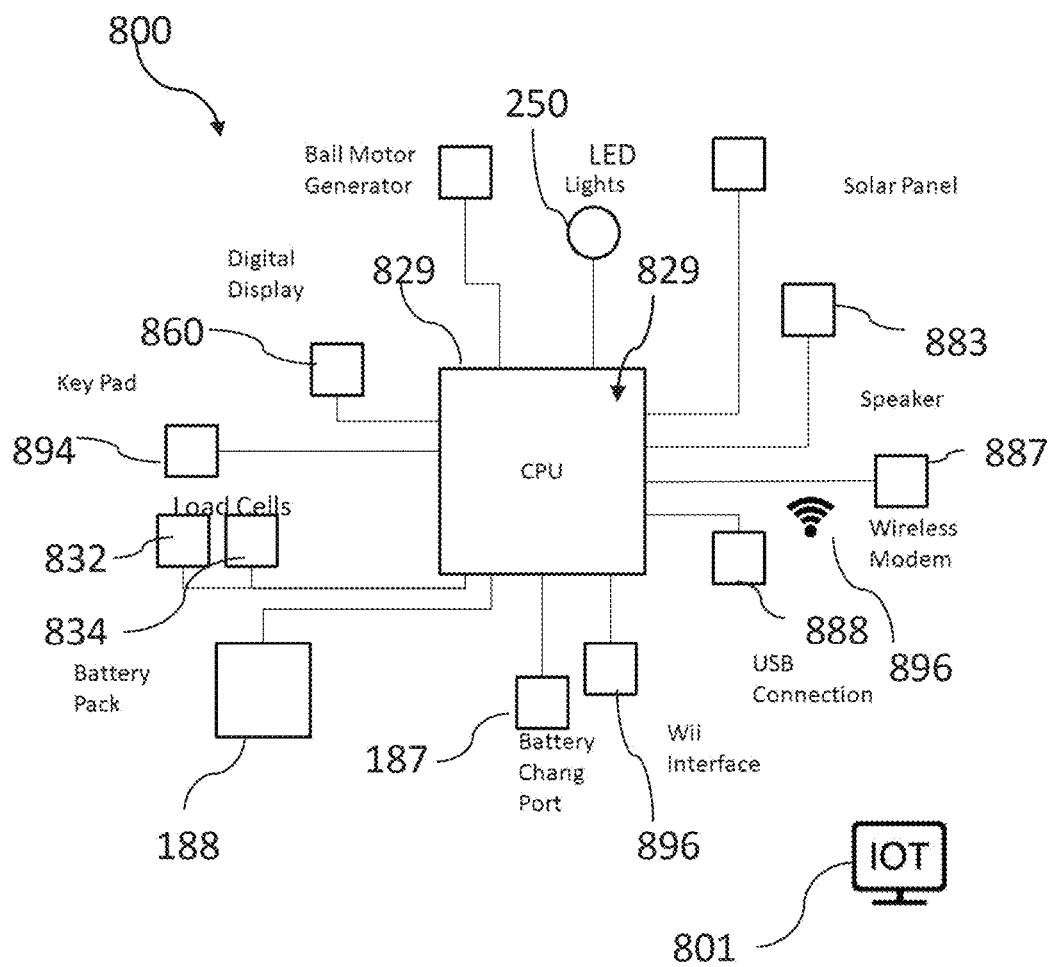
FIG. 8 illustrates a computer system of the rod and head assembly for a tennis ball training system.

FIGS. 1 and 2 further illustrate an optical sensor assembly 230 designed to determine ball member 130 spin. This internal optical sensor assembly 230 accounts for the fact that ball members 130 such as a tennis ball will deform when hit, as tennis balls are designed to do, but the spin on the tennis ball can be calculated before deformation becomes significant enough to distort calculations of spin. The internal optical sensor assembly 230 is disposed on the outside surface of the concave proximal face portion of the ball cup member 241 and is similar or the same as an optical sensor assembly 230 used on a computer mouse trac ball wherein a LED laser 233 laser beam is projected onto a targeted first surface portion of the ball member 131 at an acute angle from perpendicular to the targeted first surface portion of the ball member 131 and reflects to at least one light sensor 234. Because the internal optical sensor assembly 230 can leverage the speed of light reflecting substantially from the ball member 130 to create data from the behavior of the ball member 130, limited thereafter, with reference to FIG. 8, only by the speed of the microprocessor 829 using the data, the microprocessor 829 can obtain the information needed to determine spin from micro-changes in the first surface portion of the ball member 131 position. These changes may then be communicated to the alternate reality system 20 for conversion into virtual images. With reference to FIG. 8, a computer system 800 can, therefore, track the spin that would have been imparted on a free tennis ball before the ball member 130 in the ball cup member 140 substantially deforms. There are no moving parts and no need for a momentum-based or force-impact sensor/accelerometers 283 to determine the spin on the ball member 130. A three-axis impact sensor assembly 240 is arrayed on three axes within the head assembly 100 and positioned distally to the proximal face portion of the ball cup member 242 to detect head movement. The three-axis impact sensor assembly 240 is made from force impact sensors/accelerometers 283 that detect changes of movement along three axes x, y, and z, which will vary depending upon the force and angle of impact on the ball member 130, thereafter transferred to the head assembly 100.

Figure 10:
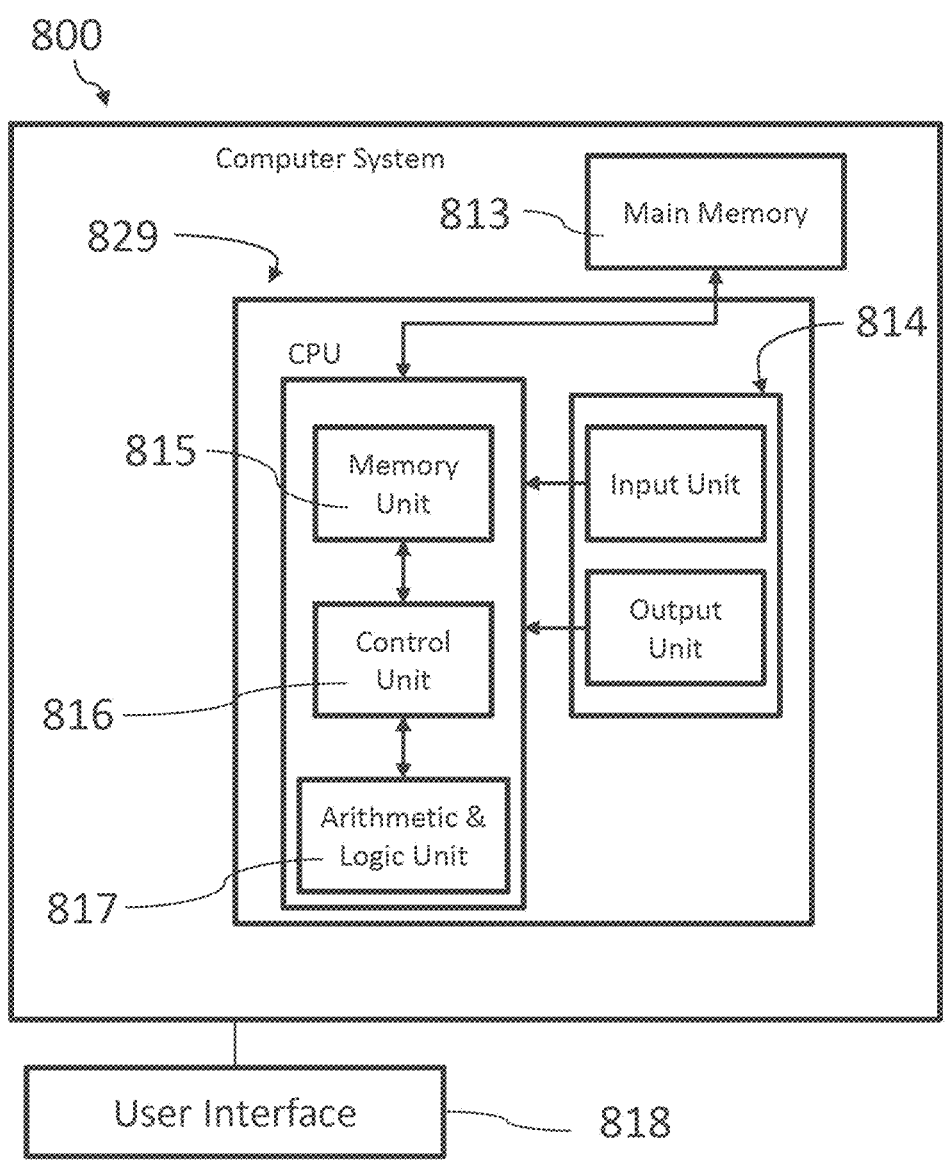
FIG. 10 illustrates a representative computer system and computer processor CPU.

FIGS. 1 and 2 further illustrate an embodiment where at least one tri-colored light-emitting diode member (LED) light member 250 is mounted at a top portion of the ball cup member 241, electrically and operably coupled by at least one electrical coupling member 253 to the optical sensors 230, three-axis impact sensor assembly 240. The internal optical sensor assembly 230 is designed to detect spin force from the first surface portion of the ball member 131 when the racket impacts the ball member 130. The LED light member 250 can produce up to 256 different colors of light and has periodic light production capabilities from which to produce flashes of different lengths, patterns, and intensities. The colors and patterns serve to provide feedback and instruction, for example, to tell a user that the spin, timing, or trajectory of the ball member 130 as that ball member 130 would move if not held by the ball cup member 140 are correct or incorrect, or to signal which hit to perform next, all of which may be further projected by the alternate reality system 20. A process underlying how the LED light member 250 is used, with reference to FIG. 10, is the Eye Coach PATTSS process 10. The LED light member 250 will also be operably connected to flex sensors 260 within the polymer flexible rod assembly 120 holding the head assembly 100, the flex sensors 260 detecting the bend of the polymer flexible rod assembly 120 and operably connected to the three-axis impact sensor assembly 240 to match bend with the timing of an impact. As a training tool, the intent is for a student to time the impact of his or her racket on the ball member 130 when the oscillating polymer flexible rod assembly 120 is straight up and with substantially no bend. The LED light member 250 will present a color, pattern, or both within $1/10^{th}$ second of impact with a racket, for example, a color communicating feedback about the shot, such as the spin and placement, and a pattern communicating the next shot to attempt, such as a spin or backhand.

FIGS. 1 and 2 further illustrate that more than one LED light member 250 may be mounted, for example, one for showing a color and another for showing a pattern. The LED light member 250 in this embodiment will be timed to shut off at the critical moment before a racket hit accorded to the Eye Coach PATTSS process 10 training method so that the user will not be distracted by the LED light member 250 in the moment when the user must focus on the ball member 130, the representative 3 feet a tennis ball represented by the ball member 130 travels before the racket makes contact. The LED light member 250 can be used in lieu of, or to complement, or to be complemented by, audio instructions where the light-base instructions better allow for a setting where multiple students train and where audio feedback or instructions could be distracting. Audio signals, when used, may provide verbal feedback or instructions. Audio signals may also be used to provide spin feedback to account for some loss of feel by a ball member 130 that is not spinning in the head ball cup member 140. Just as a baseball player and people in the stands can hear a certain quality of impact when a player hits a home run, a tennis player will know a certain quality of sound associated with a good hit, a sound which can be emulated to provide added feedback and the satisfaction of a good hit, that emulation which may occur through the alternate reality system 20 via speakers that would be inherent within. An example of use would be to have audio communicate the success of the shot, perhaps with a color indicator LED light member 250 as well, and then have a flash or audio signal communicate the next shot to take. Such could be a programmed item where either light or audio could be a solo, dual, or omitted source of feedback.

FIGS. 1 and 2 further illustrate that the sensors in this embodiment, including internal optical sensors 230, light sensors 234, accelerometers 283, three-axis impact sensor assembly 240, flex sensors 260 will be connected through wire members 254, and a central ribbon wire member 256 bent so that it is driven into a ribbon wire connector member 257 when a user hits the ball member 130. Connections may also be wireless with associated antenna. The positioning of the central ribbon wire member 256 is important for system durability given that wires withstand being pressed better than stretched. The ribbon wire member 256 will be enclosed, and a supplementary cap portion 258 may be included to help protect the ribbon wire member 256 and seat the head assembly 100. The ribbon wire member 256 is electrically coupled to a power source 160 by a bottom portion of the ribbon wire member 259. A top portion of the ribbon wire member 251 is coupled to a distal surface of the ball cup member 140, the top portion of the ribbon wire member 251 disposed to substantially abut, as illustrated in FIG. 3, the proximal face of the retaining plate member 311.

Figure 4:
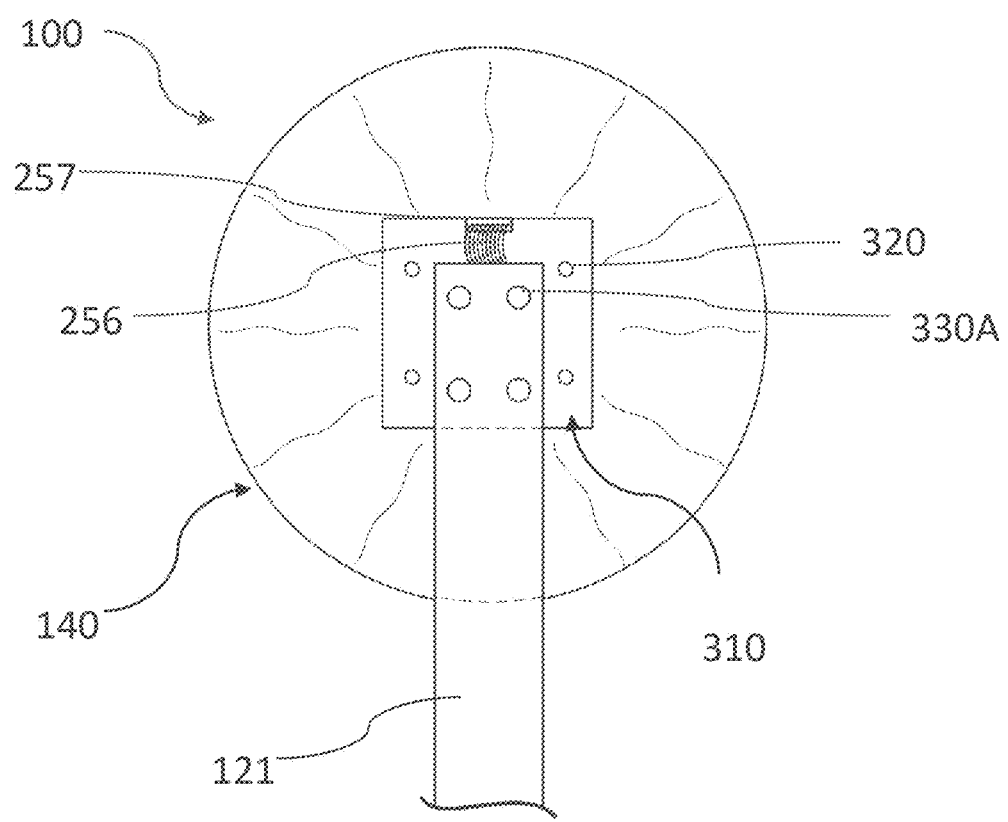
FIG. 4 illustrates the back view of the head assembly of the rod and head assembly for a tennis ball training system.

FIGS. 1, 3, and 4 illustrate an embodiment of the vertical polymer flexible rod assembly 120. The head assembly 100 is coupled to the top portion of the vertical polymer flexible rod assembly 121, a bow-flex style polymer rod assembly, at a distal surface of the ball cup member 140, by a retaining plate member 310 with four bolt attachment hole members 320 and associated helically threaded attachment members 321 wherein the vertical polymer flexible rod assembly 120 is sandwiched between the head assembly 100 in a concave proximal face portion of the retaining plate member 311. The position is maintained by projection members 331 inserted through the four projection attachment hole members 330A of the retaining plate member 310 and four projection attachment hole members 330B at the top portion of the vertical polymer flexible rod assembly 121 that are at least partially slidable to account for impact but that have the role to keep the head assembly 100 aligned and on the vertical polymer flexible rod assembly 120 as projection members that are unthreaded. The attachment hole members in the bow may further be reinforced by rubber, hollow, cylindrical pin members 332 so that the rubber, hollow, cylindrical pin members 332 are subjected to potentially wearing forces instead of the vertical polymer flexible rod assembly 120, and so that the rubber, hollow, cylindrical pin members 332 can be replaced without replacing the entire vertical polymer flexible rod assembly 120. Also at the top portion of the vertical polymer flexible rod assembly 121 is the ribbon wire member 256 and the ribbon wire connector member 257 with the retaining plate member 310 serving as a backstop so the ribbon wire member 256 may be subject to compression, which it can withstand better than stretching. The vertical polymer flexible rod assembly 120 eliminates a requirement for a metal spring.

Figure 5:
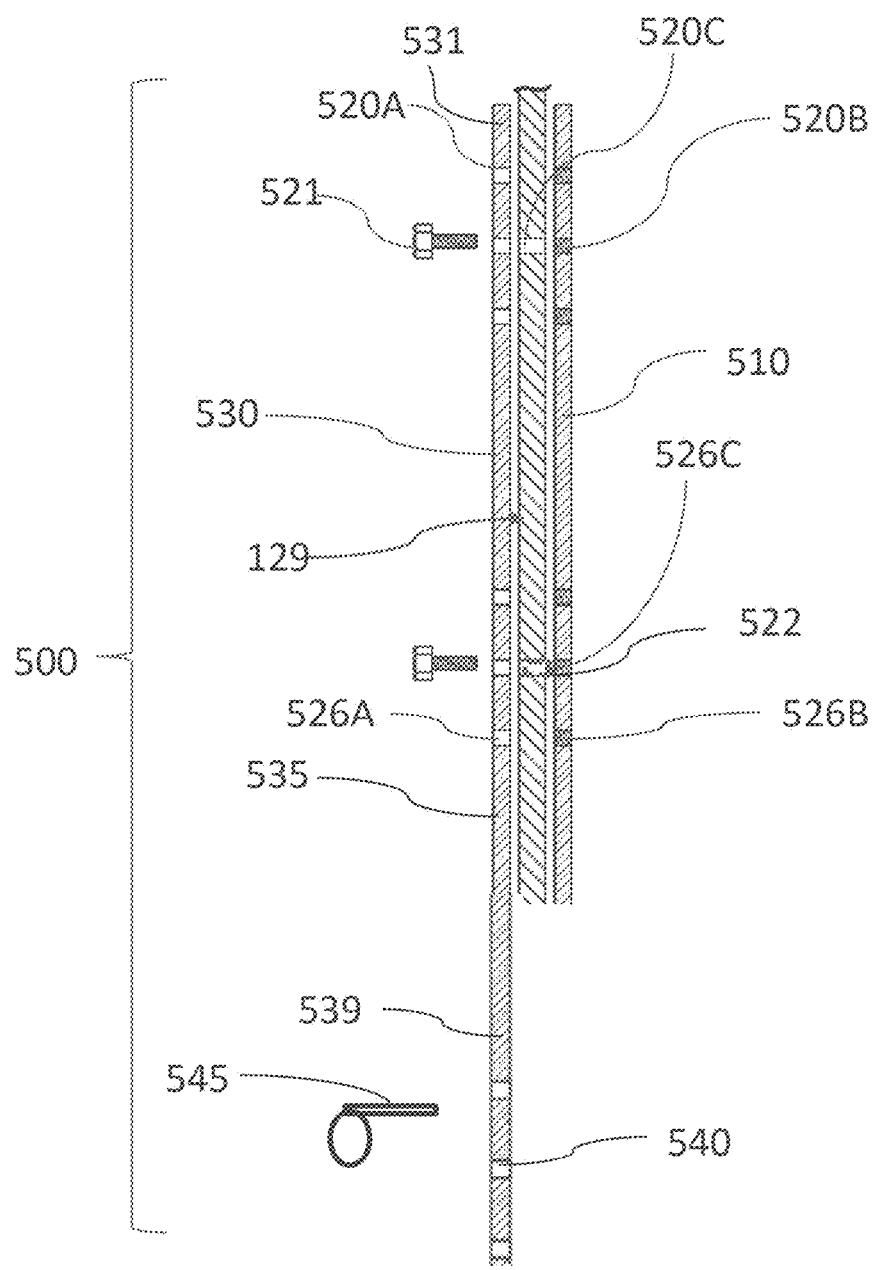
FIG. 5 illustrates a lower portion of the rod assembly of the rod and head assembly for a tennis ball training system.

FIGS. 1 and 5 illustrate an embodiment of the vertical polymer flexible rod assembly 120 that is supported at a bottom portion of the vertical polymer flexible rod assembly 129 by a backplate member 510 and a metal base plate member 530 that form a base mount assembly 500. The backplate member 510 has at least three threaded attachment hole members in a top portion of the metal base plate member 531 and at least three upper attachment hole members 520A in a bottom of the metal base plate member mirrored by at least three non-threaded attachment hole members 520C through the top portion of the metal base plate member and at least three non-threaded attachment rod hole members 520B through a lower portion of the vertical polymer flexible rod assembly 129 wherein a plate helically threaded attachment member 521 disposed through each attachment hole member sandwiches the greater assembly 500 and 129 together. This embodiment of the backplate member 510 has at least three additional threaded attachment hole members in a middle portion of the metal base plate member 535 and at least three upper attachment hole members 526A in a bottom of the metal base plate member mirrored by at least three non-threaded attachment hole members 526C through the top portion of the metal base plate member and at least three non-threaded attachment rod hole members 526B through a lower portion of the vertical polymer flexible rod assembly 129 wherein a plate helically threaded attachment member 521 disposed through each attachment hole member further sandwiches the greater assembly 500 and 129 together. The attachment hole members 520A-520C and 526A-526C in this portion of the vertical polymer flexible rod assembly 120 may also further be reinforced by plate rubber, hollow, cylindrical pin members 522 so that the rubber on the plate rubber, hollow, cylindrical pin members 522 are subjected to potentially wearing forces instead of the polymer of the vertical polymer flexible rod assembly 120. The plate rubber, hollow, cylindrical pin members 522 can be replaced without replacing the entire vertical polymer flexible rod assembly 120. An upper portion of the vertical polymer flexible rod assembly 120 is designed to oscillate from racket impact energy imparted on the ball cup member 140 and the associated head assembly 100. At least one bottom base attachment hole member 540 on a bottom portion of the base plate member 539 is designed to be aligned with at least one removable lock pin member 545 and, with reference to FIG. 1, at least one hole member of a substantially hollow vertical sleeve member 170 of the stand assembly 110. The thickness of the plate members 510, 530 in this embodiment is about one-sixth of an inch thick, though other thicknesses could be used, and in this embodiment is made from galvanized steel, though other metals or polymers could be used. The bottom portion of the metal base plate member 530 is mounted to the stand assembly 110 through a series of the at least one removable lock pin member 545 on the hollow vertical sleeve member 170. The at least one attachment hole members 540 disposed through the bottom portion of the metal base plate member 539 and the hollow vertical sleeve member 170 allows, in this embodiment, the height of the vertical polymer flexible rod assembly 120 and head assembly 100 to be set higher or lower by substantially eighteen inches at six-inch intervals in the preferred embodiment though other spacings could be used.

Figure 6:
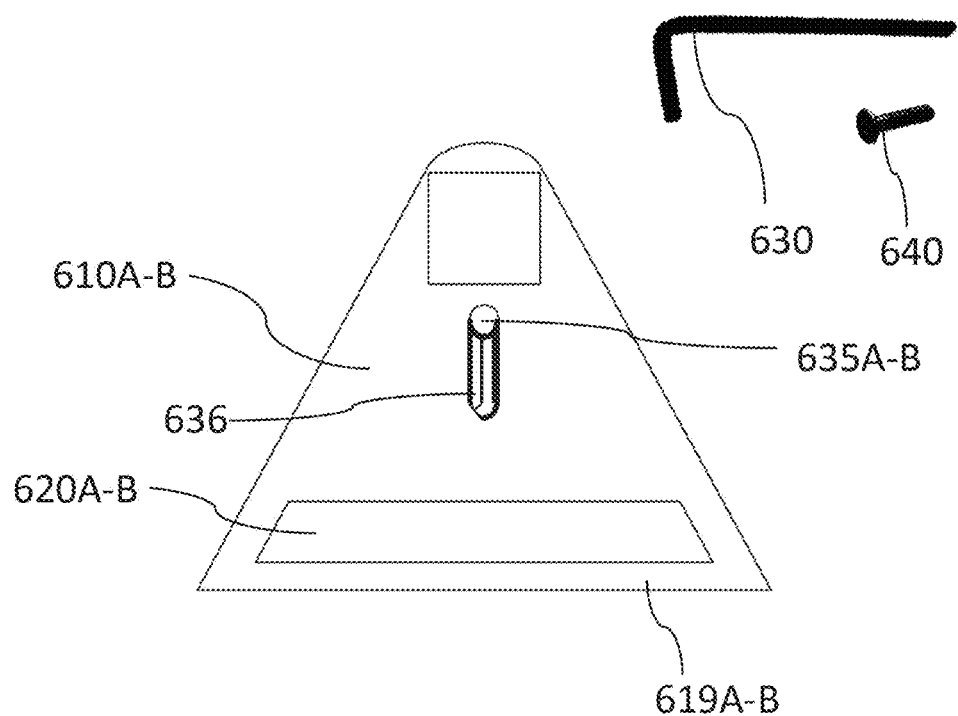
FIG. 6 illustrates a proximal view of a polymer boot member of the rod and head assembly for a tennis ball training system.
Figure 7:
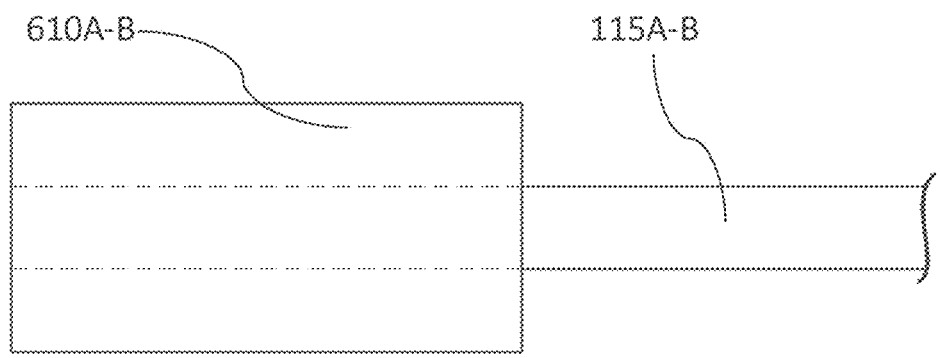
FIG. 7 illustrates a side view of the polymer boot member of the rod and head assembly for a tennis ball training system.

FIGS. 1, 6, and 7 includes elements of the representative stand assembly 110 inclusive of right and left polymer boot members 610A-610B at right and left proximal ends of the stand assembly 111A-111B, the polymer boot members 610A-610B disposed partially over each of right and left horizontal leg members 115A-115B, the polymer boot members 610A-610B having a concave, compressible space 620A-620B above a base portion of each polymer boot members 619A-619B for shock absorption. An Allen wrench slot portion 635A-635B is disposed in the polymer boot members 610A-610B to secure at least one Allen wrench 630, the Allen wrench slot portion 635A-635B having an elongate horizontal portion and a shorter vertical depression portion in which fits substantially an entire Allen wrench and may also have a cog or otherwise an at least semirigid flap or spur of polymer 636 that secures the Allen wrench so that it cannot slide out on its own. The screw members on the preferred embodiment will be Allen-head screw members 640 with fine threads designed to handle more torque than similarly sized helically threaded connectors with strait or Phillips heads. FIGS. 1, 2, and 8 illustrates the computer system 800 designed to receive, process, dispense, store, and analyze data, wherein the preferred embodiment puts these items within or attached to the stand assembly 110 and wherein those elements would not be subject to the forces of training impact and may further support the alternate reality system 20. The computer system 800 would also, therefore, be a part of the most durable element of the system and may be its own standalone module coupled to the stand assembly 110. These elements will be designed to work independently of a network or smart device but could also be designed for an Internet of Things (IoT) environment 801 as might be a training environment where the state of the systems in use can be monitored and items, such as needed maintenance, detected before such items can damage other parts of the system. An IoT environment is one embodiment where data may move between the physical training system 10 and a cloud environment supportive of the alternate reality system 20. Where audio is used, a speaker assembly 883 is included and operationally coupled to the microprocessor 829. The computer system 800 can be standalone, can be made to use apps from a smartphone, or both. The system may also be gamified so that users can play against their own performance or against the performance of others, calculating data in accord with at least one gamified scoring method for users to play against their own performance and against the performance of others.

Two load cells 832, 834 may be provided for added data to determining whether the ball member 130 is properly struck with a racket by the user, the data which may be employed for the alternate reality system 20.

Figure 9:
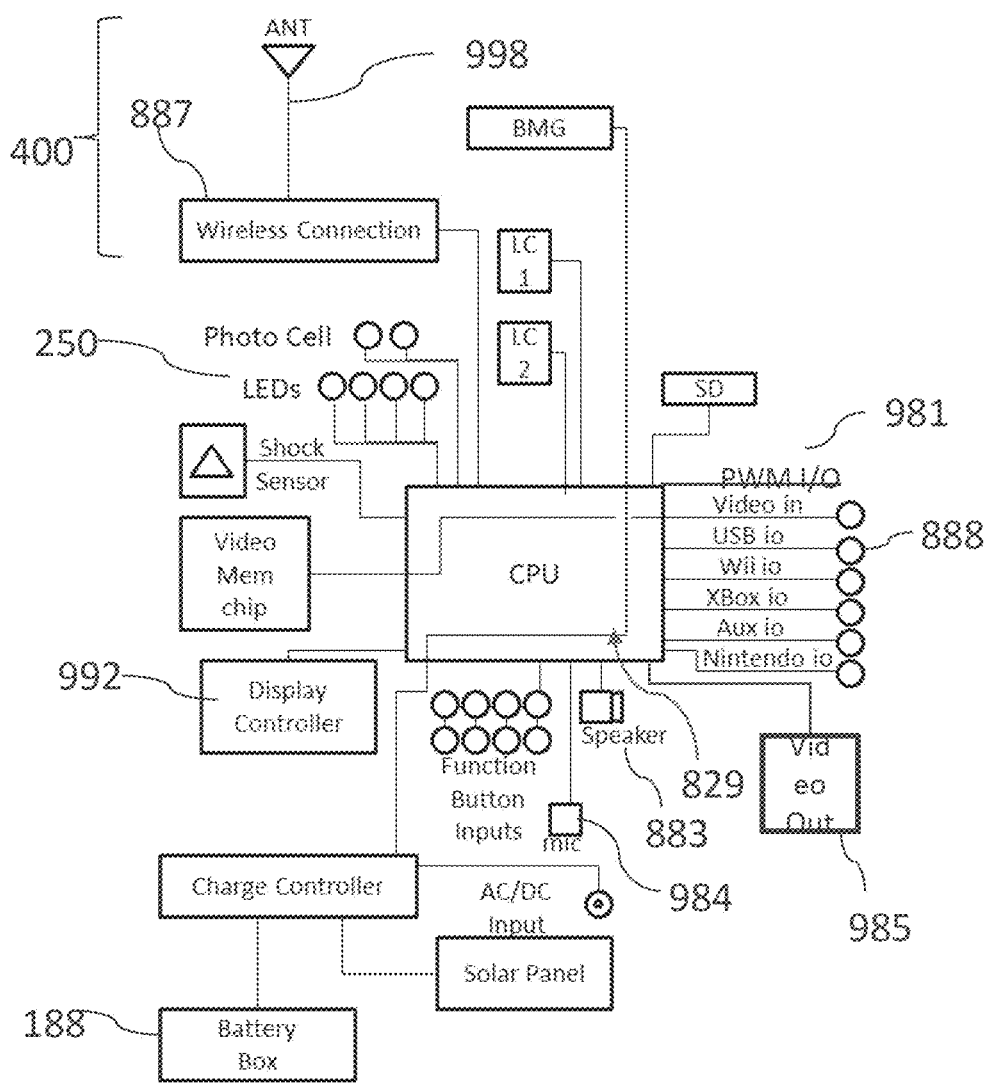
FIG. 9 illustrates interface components of the rod and head assembly for a tennis ball training system.

FIGS. 1 and 8 further show a USB port 888 for data, control operation of the speaker 883, clear stored data, with reference to FIG. 9, control operation of a microphone 984, cause data to be displayed on a display 860, cause training data to be stored in the microprocessor or CPU 829, to control operation of the USB port 888, control operation of the Wii port 896, and control connection to an external device such as but not limited by an XBox, Wii, Nintendo, or Kinect. The display 860 can display items including amount of practice time elapsed, total hits, total good hits, remaining practice time, whether ball spin has been initiated, indicate on/off status and/or provide a system ID. The microprocessor 829 for controlling operation of the present inventive concept is also housed in a base assembly 174 as well as being powered by one or more battery members 160 or similar devices stored in a power pack 188 and operationally coupled to a charging port 187.

With reference to FIGS. 2 and 9, the microprocessor 829 is operably coupled to the electronic components in the inventive concept. There are several Input/Output (I/O) signals and ports on the device such as a Pulse Width Modulation (PWM) I/O signal 981, an Audio Output (Speaker) 883, as well as for Video Output 985, and Data signal outputs. The device will also have multiple wireless capabilities, such as Bluetooth or Wi Fi wireless connections 887 to routers. These interfaces with other electronic devices provide for remote interaction, training, and programming and may support interaction with the alternate reality system 20. The main function is to monitor and record all inputs, calculate that raw information, and provide real-time feedback via data and through the virtual ball member 131.

Internal optical sensors 230, three-axis impact sensor assembly 240, flex sensors 260 and feedback profiles may be programmed into the local memory of the inventive concept or may be in the cloud or on an operationally coupled device such as a smartphone or computer pad. Parameters for performance will be programmed into different levels, and multiple voice responses may randomly be given via the speaker 883 for the same result. i.e.: "Well done", "Good job", "That's the way", "Way to go', and several others, may be pre-programed audio type responses generated from the device for a good hit, or the user might receive audio cues, such as a sound emulating a well hit or poorly hit ball, or visual signals from the light-emitting diode member/LEDs. Levels may include differing degrees of difficulty for users, degrees which may involve such variables as types of shots the user is required to perform, and the acceptable degree of error allowed on the PATTSS format to still register a satisfactory shot. A microphone 984 may be provided to allow communications between a user and the microprocessor 829. A USB port 888 is provided to allow easy transfer of data stored in the microprocessor 829. The microprocessor 829 may be coupled to an Xbox, Kinect, or Nintendo or such device as desired, wirelessly or directly. The digital display controller 992 allows display of data resulting from use of the inventive concept in a suitable format for easy viewing and understanding. The data to be displayed can include amount of time practiced, total hits, total good hits, remaining practice time, direction of ball spin, an indicator showing that the device is operable as well as log-in information. Also associated with the microprocessor 829 is a keypad 894 allowing inputting of commands to the microprocessor 829. A Wi-Fi interface 896 allows wired connection to the Internet while a wireless connection 887 also has an antenna 998 to facilitate wireless Wi-Fi connection. These Wi-Fi connections permit communications with remote teachers or other persons or machines, including the alternate reality system 20.

Figure 15:
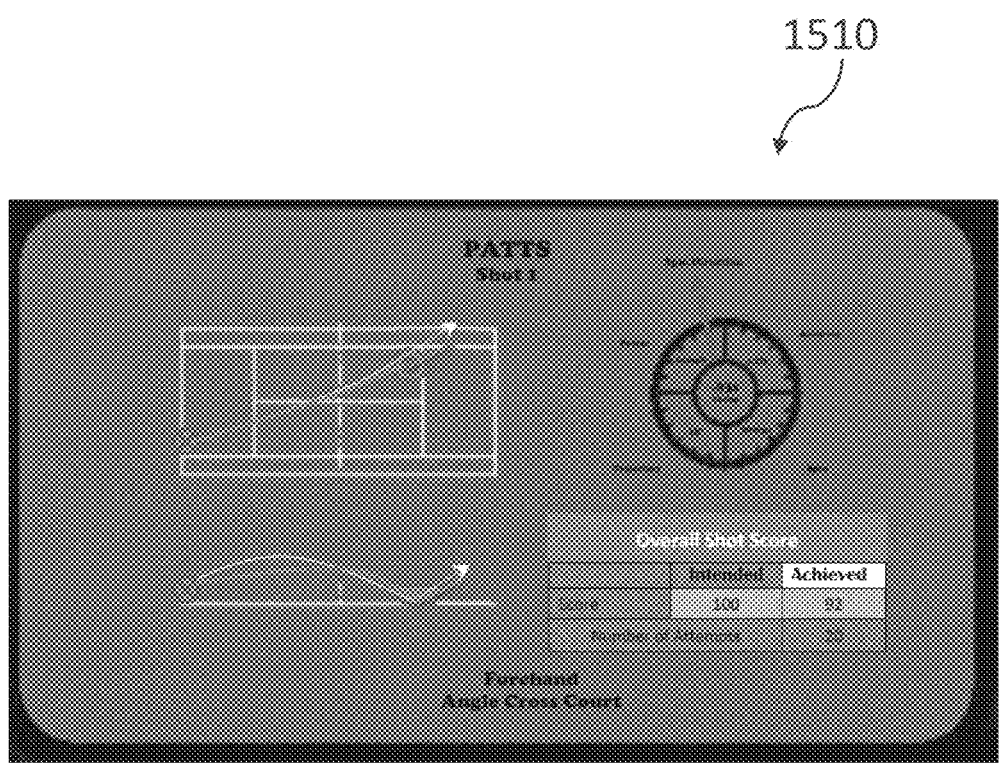
FIG. 15 illustrates a representative score presentation.
Figure 16:
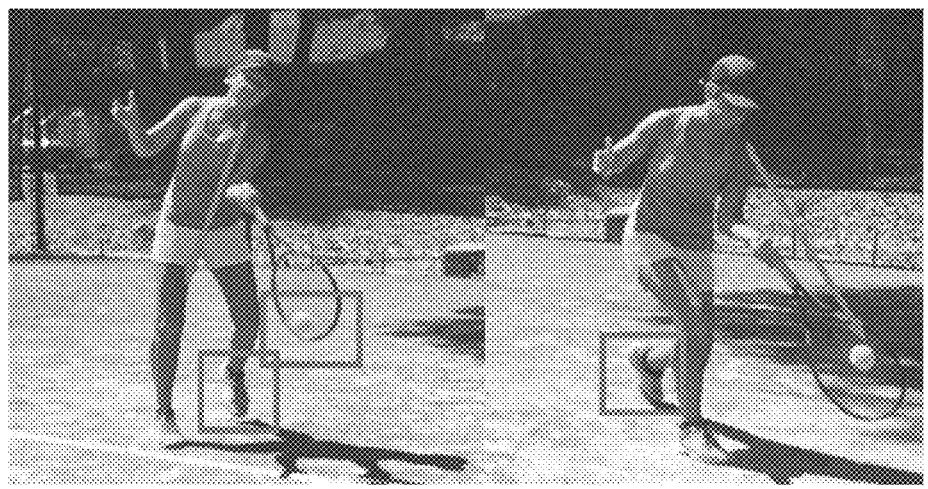
FIG. 16 illustrates representative user image vectors.
Figure 17:
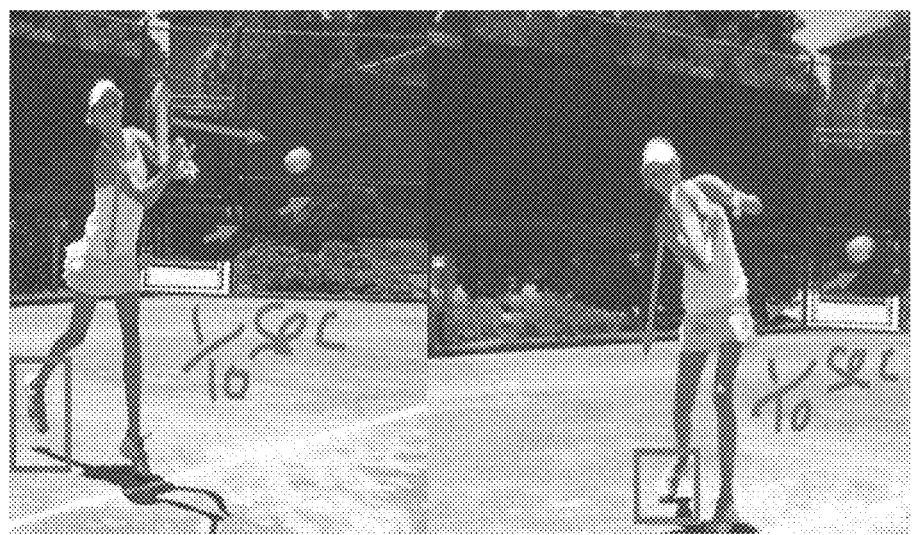
FIG. 17 illustrates a second representative user image vectors.
Figure 19:
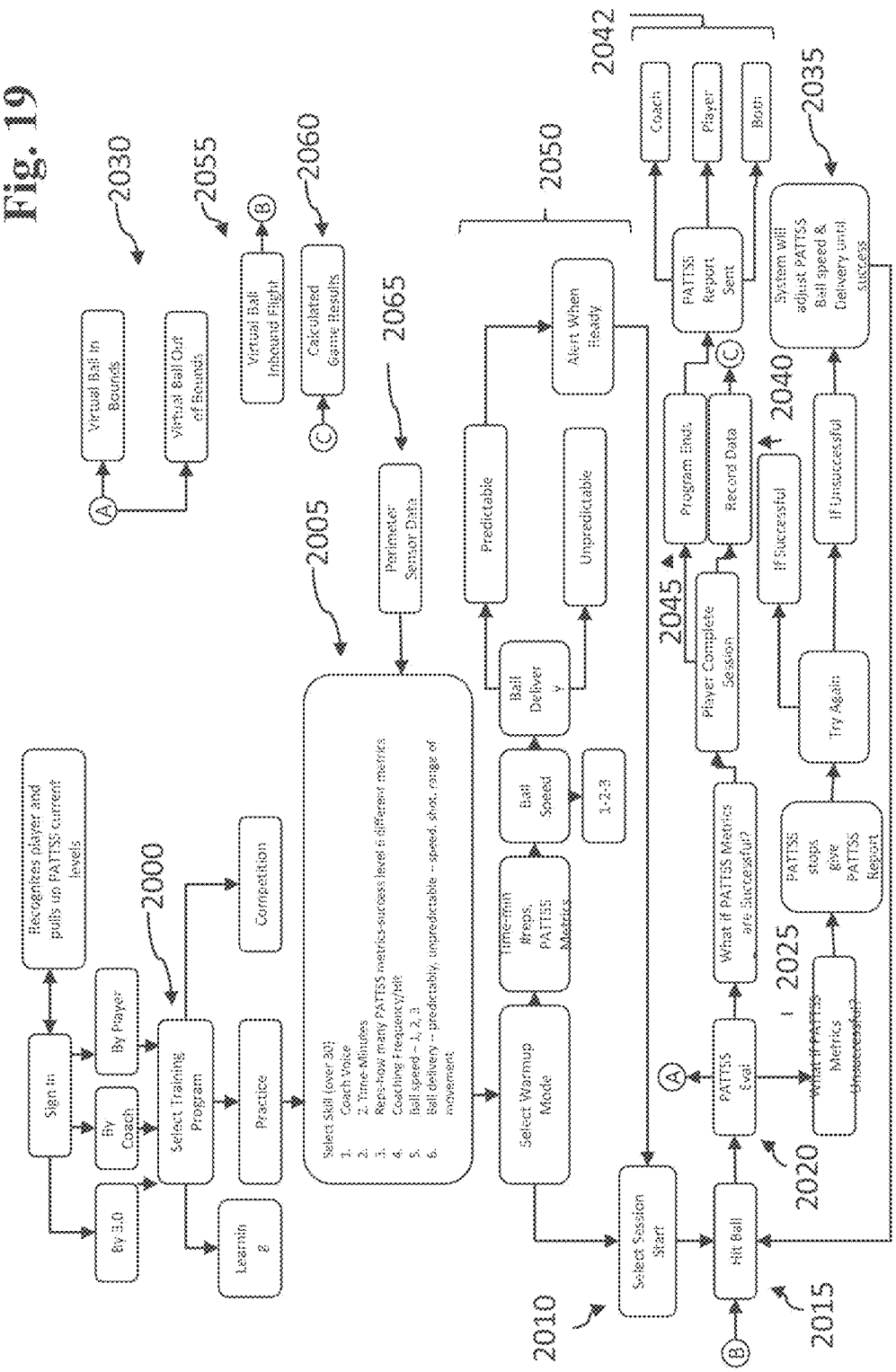
FIG. 19 illustrates the PATTSS (Power, Accuracy, Timing, Trajectory, Spin, Sweet spot.) training format of the rod and head assembly for a tennis ball training system.

FIG. 10, illustrates the PATTSS flow 10 that in this embodiment would be utilized within the computer system 800 to train a student. PATTSS stands for (Power, Accuracy, Timing, Trajectory, Spin, and Sweet spot.). Power is the energy delivered to a ball. Accuracy is where the player places the ball. Timing is when the player hits the ball. Trajectory is how the ball travels. Spin is the rotation the player imparts on the ball. Sweet spot is the place of impact on the racket. From these are obtained results data 1950 as illustrated in FIG. 19. Additional sensors beyond those disclosed for this embodiment may be applied to determine sweet spot or statistical assessments may be considered based on the probability that certain results will be achieved through results data 1950 obtained from the other PATTSS categories, for example, that a ball is statistically likely to behave in a desired way after a hit if the ball is consistently hit in the sweet spot. Results can be sent to and reviewed by humans and machine 1970. FIG. 15 illustrates an example score presentation 1510 for results data 1950.

The illustrated physical training system 10 is one embodiment of a physical training system that can be deployed with the disclosed alternate reality system 20. Other embodiments of a physical training system may be used.

FIG. 11 is a representative embodiment alternate reality system 20, as disclosed herein, which includes at least one or more of virtual reality, mixed reality, and augmented reality. Virtual reality (VR) is a simulated experience that can be similar to or different from the real world. Applications of virtual reality include entertainment (e.g. video games) and education (e.g. medical or sports training). Other distinct types of VR-style technology include augmented reality and mixed reality, sometimes referred to as extended reality or XR. Augmented reality (AR) is an interactive experience of a real-world environment where the objects that reside in the real world are enhanced by computer-generated perceptual information, sometimes across multiple sensory modalities, including visual, auditory, haptic, somatosensory, and olfactory. AR can be defined as a system that fulfills three basic features: a combination of real and virtual worlds, real-time interaction, and accurate 3D registration of virtual and real objects.

Figure 18:
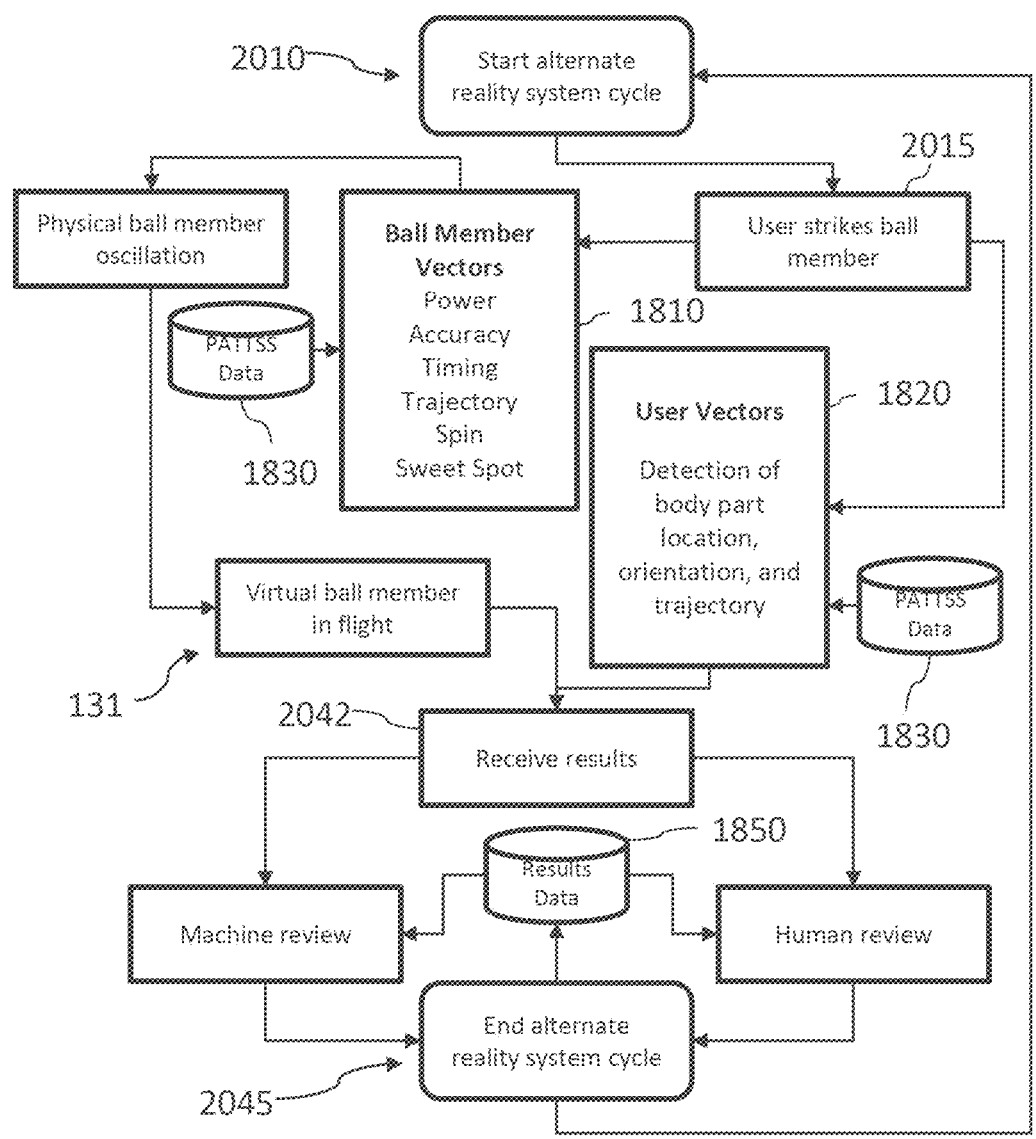
FIG. 18 illustrates a representative system and method for using the alternate reality system for a rod and head tennis ball training system assembly.

FIG. 18 illustrates an embodiment of the alternate reality system inclusive of results databases 1850, ball vectors 1810 from PATTSS data 1830 and user vectors 1820 from PATTSS data 1830, and that may be presented using wearable devices and may also be projected on at least one or more screens. The overlaid sensory information can be constructive (i.e. additive to the natural environment), or destructive (i.e. masking the natural environment). The experience for a given user is interwoven with the physical world such that it may be perceived as an immersive aspect of the real environment. In this way, augmented reality alters the user's ongoing perception of a real-world environment, whereas virtual reality completely replaces the given user's real-world environment with a simulated one. Augmented reality is related to two substantially synonymous terms: mixed reality and computer-mediated reality. As defined in this disclosure, the various computer-generated realities are termed "alternate reality systems."

A user in this disclosure may also be termed a player. A given player using the representative alternate reality system 20 for the inventive concept would at least partly see the oscillations 278 of the physical training system 10—the physical training system 10 inclusive of the head assembly 100, stand assembly 110, and polymer flexible rod 120—as a ball moving through space based on the data transmitted from sensors, including at least one or more of sensors from a group of internal optical sensors 230, light sensors 234, three-axis impact sensor assembly 240, flex sensors 260, and accelerometers 283 disposed on the physical training system 10. Oscillations 278 and the alternate reality system 20 are synchronized where the inventive concept presents the opportunity for players training in an alternate reality environment to also hit the physical ball member 130. The inventive concept enhances the benefits offered by the physical training system 10 by providing a more realistic representation of ball flight while offering a consistent position of the physical ball member 130 for each shot so the given player can practice that given shot, the virtual representation of incoming ball member 130 flight of a virtual ball member 131 intercepting the ball member 130 when the user should impact the ball member 130.

While the alternate reality system 20 is designed for user training, it also offers an opportunity for competition. Such competition could be oriented on shot precision, difficulty, and form, comparable to judging for gymnastics as opposed to a player-on-player effort to hit a ball inbounds that an opponent cannot return.

The alternate reality system 20 in the representative embodiment would use P.A.T.T.S.S. data, short for (Power, Accuracy, Timing, Trajectory, Spin, Sweet spot) from a physical training system 10 to position a ball in the alternate reality universe. The data affords:
1. Sweet spot (Landing area on racket strings)
2. Accuracy (Landing area on court)
3. Spin (RPM)
4. Trajectory (Height over net)
5. Power (MPH)
6. Timing (Balance)

These include variables needed by alternate reality processors to calculate and project virtual ball 131 flight after impact with a racket on the ball member 130. PATTSS data focuses on training skills as a critical zone 134 where the ball member 130 is in the range of about three feet from users, and the alternate reality system 20 extends the opportunity to create a visual representation of the ball member 130 as a virtual ball member 131 where the virtual ball member 131 can be viewed both inside and outside the three feet critical zone 134 from users.

The alternate reality system 20 would project images based on these data to the user at a minimal refresh rate of 60 frames per second. The alternate reality system 20 would be projected to at least one or more of a user wearable and user screen and could also be projected to a coach or observer in tandem with the user or apart from the user, the latter leaving the user unencumbered by any technology but easing the ability of the coach or observer to communicate outcomes and corrections. As such, the alternate reality system 20 can be effective for training on a tennis court and can also be effective for training in a room such as a bedroom, garage, basement, or living room, where the requirement is only a having a large enough space for users to swing their rackets. The alternate reality system 20 may be presented either or both in real time and after a training session. Delay should be a millisecond or less, and as such, the inventive concept would favor 5G connections and associated components in preferred embodiments, though other connections could be used.

The alternate reality system 20 would be an independent add-on to the Eye Coach physical system 10 but could be built in if desired. As an add-on, the alternate reality system 20 would have, in one representative embodiment, its own computer system 800 inclusive of a controller or CPU 829, as illustrated in FIGS. 9 and 10, which would be operationally coupled wirelessly or through a hard connection to the computer system 800 of the physical training system 10 and would convert PATTSS data 1830 to project ball member 130 speed, space, time, trajectory, and qualities such as spin. The user may see only outbound flights of the virtual ball member 131 or the virtual ball member 131 may be returned such as by a virtual player. Whether the virtual ball member 131 is returned by a virtual player or starts its flight by heading toward the user, the virtual system and the physical ball member 130 of the physical training system 10 appear to intersect at the physical location of the ball member 130 of the physical training system 10 when the ball member 130 is at the top of an oscillation 278, so the physical and virtual worlds meet at the critical moment of optimal strike for the user. Additional cues may be needed for a user to understand where the intersection will be, particularly in an all-immersive virtual environment. The most important aspect for training, however, is the opportunity for players to observe in a virtual world the outbound hit. Therefore, a preferred embodiment is the augmented reality system 20 applying the PATTSS data 1830 and projecting to a user and coach the flight of a hit ball member 130 without attempting to visualize an incoming ball member 130 or, where there is an incoming ball member 130, also projecting in the virtual world the specific point where the user should hit the ball member 130, for illustration, a hollow sphere that the incoming virtual ball member 131 will occupy at the precise moment the user should strike the ball member 130.

Alternate reality wearables 420 could capture rays of light that would otherwise pass through the center of the lens of the wearer's eye and substitutes synthetic computer-controlled light for each ray of real light. The wearable 420 may use a computer-controlled laser light source that has infinite depth of focus and causes the eye itself to, in effect, function as both a camera and a display by way of exact alignment with the eye and resynthesis (in laser light) of rays of light entering the eye, these being expected components of a wearable 420. The visual resolution need not be at 1080p but should not go below 720p. Augmentation techniques would be performed in real time and in semantic contexts with environmental elements. Immersive perceptual information would sometimes be combined with either or both of performance feedback information and a live video feed of the training session. The primary value for the user is to blend with the physical training system 10 the data and components of the digital world to create for the user a useful perception of the real world through the integration of immersive sensations, which are perceived as natural parts of a user's environment. Wearables 420 may include, but are not limited to, eyeglasses, heads-up-displays (HUD), contact lenses, virtual retinal displays, eye taps, and special augmented reality, the latter involving projecting where the user sees an image on a wall, screen, or other surface, the user viewing the ball member 130 within an alternate reality space from at least one or more from the group of: eyeglasses, heads-up-displays (HUD), contact lenses, virtual retinal displays, eye taps, and special augmented reality. A screen projection, which could also extend to a floor projection or reverse floor projections, could compensate for the immobility of the physical training system 10 by moving the projected image around the user.

The physical training system 10 may include a human head location, orientation, and trajectory detector for player users that may include at least one or more of the wearable 420 and fixed sensors optical sensors 230 posted where the physical training system 10 is used. The worn sensors 290, as disclosed in FIG. 11, may be incorporated into the existing wearable used to support the alternate reality system 20 elements already noted. The fixed external optical sensor units 280 arrayed toward the user, possibly also receiving data from a reflector 239 an at least one sensor worn by the user worn sensors 290 the 1) location, 2) orientation, and 3) trajectory of the user's head all in a three-dimensional X, Y, Z axis space and over time. In one embodiment, there would be three or more external optical sensor units 280 located substantially across from each other to overlay the area where the physical training system 10 is used so that triangulation can afford the location and trajectory of the user's head and—with the possible addition of at least one worn sensor 290 sense orientation and changes in orientation. Other sensors in this example embodiment include perimeter sensors 289.

Other sensor arrangements may be used wherein sensors include any one or more of external optical sensors 280, perimeter sensors 289, and worn sensors 290, which may detect where the user's head is, which way the user is facing, and how the user is moving such as via a localization grid involving the plurality of perimeter sensors 289 around the area of the physical training system 10 or a given sensor system from the external optical sensors 280 and perimeter sensors 289 that can aim toward a given user, for example, a target 237 disposed on the user for direction involving aiming the external optical sensors 280 and reflecting light back to the external optical sensors 280 for distance where external the optical sensors 280 may further allow determining orientation or a change in light wavelength reflected back can allow determining orientation. Further, additional sensors from the group of external optical sensors 230, perimeter sensors 289, and worn sensors 290 may pair head movement with detecting where the user's eyes are looking at given measurement intervals. How the internal optical sensors 230, light sensors 234, three-axis impact sensor assembly 240, flex sensors 260, external optical sensors 280, perimeter sensors 289, and worn sensors 290 are arrayed, and the type of sensors used, provide the three essentials of 1) location, 2) orientation, and 3) trajectory set on an X, Y, and Z grid of three-dimensional space over time. The worn sensors 290 may further allow detection of the location, orientation, and trajectory of other body parts such as legs, arms, hands, feet, and torso and inclusive of torsion. Ball hit performance data is calculated from variables including the group from: sweet spot (landing area on racket strings), accuracy (landing area on court), ball spin (RPM), ball trajectory (height over net), power (MPH), and timing (balance), the variables used to calculate ball member 130 motion and present that motion to a user via the virtual ball member 131, from the ball member 130 motion calculating ball vectors 1810 defining space, time, object, trajectory, and derived change of the user and the associated racket therewith, the user vectors further including orientation of eye members of the user 1820.

An alternate reality software system 270 may be operationally connected with the computer system 800. The alternate reality software systems 270 might also be disposed as a part of at least one or more of at least one cloud computer system 801 and at least one smart device wherein data is input, processed, and output to present both the alternate reality experience and performance data from which to improve user performance. Performance data 275 and the alternate reality software 270 may be stored in either or both onboard memory and offboard memory 813, as illustrated by FIG. 10.

Further illustrated in FIG. 11 is a representative embodiment of the alternate reality system 20 for the rod and head tennis ball training system assembly 10 having the at least one rod assembly 120 and head assembly 100 for a tennis ball member 130, from FIG. 1-9, the rod assembly 120 and head assembly 100 having the plurality of sensor assemblies internal optical sensors 230, light sensors 234, three-axis impact sensor assembly 240, flex sensors 260, and accelerometers 283 disposed thereon, the plurality of sensor assemblies internal optical sensors 230, light sensors 234, three-axis impact sensor assembly 240, flex sensors 260, and accelerometers 283 adapted to detect at least one or more of impact on, impact location, acceleration, deceleration, and trajectory of at least one or more of the ball member 130, the head assembly 100, and the rod assembly 120, the ball member 130 coupled to the head assembly 100 and at least partially rotatable, sensor measurements for the rod assembly 120 further including vertical polymer rod member 125 flex and oscillation 278, the aggregate contributing to data and images presented by the alternate reality system 20.

The representative alternate reality system 20 for the rod and head tennis ball training system 10 includes the computer system 800 that includes at least one computer processor 829 and user interface 818 operable with the memory storage medium 813 on which operates an alternate reality software system 270, the alternate reality software system 270 including an alternate reality software 271 and at least one sensor reading software 273 operably coupled to at least one sensor assembly inclusive of internal optical sensors 230, light sensors 234, three-axis impact sensor assembly 240, flex sensors 260, perimeter sensors 289, and worn sensors 290 of the alternate reality system 20 and the plurality of sensor assemblies, and accelerometers 283 disposed on the physical training system 10 the sensor assemblies also including at least one or more from the group of: external optical sensors 280, digital cameras 281, accelerometers 283, global positioning systems 284, gyroscopes 285, solid state compasses 286, pressure sensors 287, radio-frequency and identification tags 288, and worn sensors 290, the external optical sensors 280 including at least one or more of visible light spectrum sensors 282A and infrared sensors 282B, the infrared sensor 282B which may also be thermographic sensors 282C.

Other embodiments may include other combinations or arrangements of sensors from the group of the: external optical sensors 280 including at least one or more of visible light spectrum sensors 282A, the infrared sensor 282B which may also be thermographic sensors 282C, internal optical sensors 230, light sensors 234, three-axis impact sensor assembly 240, flex sensors 260, digital cameras 281, accelerometers 283, global positioning systems 284, solid state compasses 286, pressure sensors 287, radio-frequency and identification tags 288, perimeter sensors 289, and worn sensors 290.

FIG. 10 illustrates an exemplary computer processor central processing unit (CPU) 829, also called a central processor or main processor, which is the electronic circuitry within the representative at least one computer system 800 that executes instructions that make up a computer program, inclusive of computer programs associated with the alternate reality system 20. The CPU 829 performs basic arithmetic, logic, controlling, and input/output (I/O) operations specified by the instructions in the program. An arithmetic and logic unit (ALU) 817 is a combination digital electronic circuit that performs arithmetic and bitwise operations in integer binary numbers. Traditionally, the term CPU 829 refers to a processor, more specifically to its processing unit and control unit (CU) 816, distinguishing these core elements of a computer from external components such as main memory 813 and input output (I/O) circuitry 814. The CPU 829 may also contain memory 815. Memory 815 refers to a component that is used to store data for immediate use in the computer 829. A user interface 818 is illustrated on this representative embodiment operationally coupled to the at least one central processing unit (CPU) 829 having the at least one memory unit 815.

Figure 13:
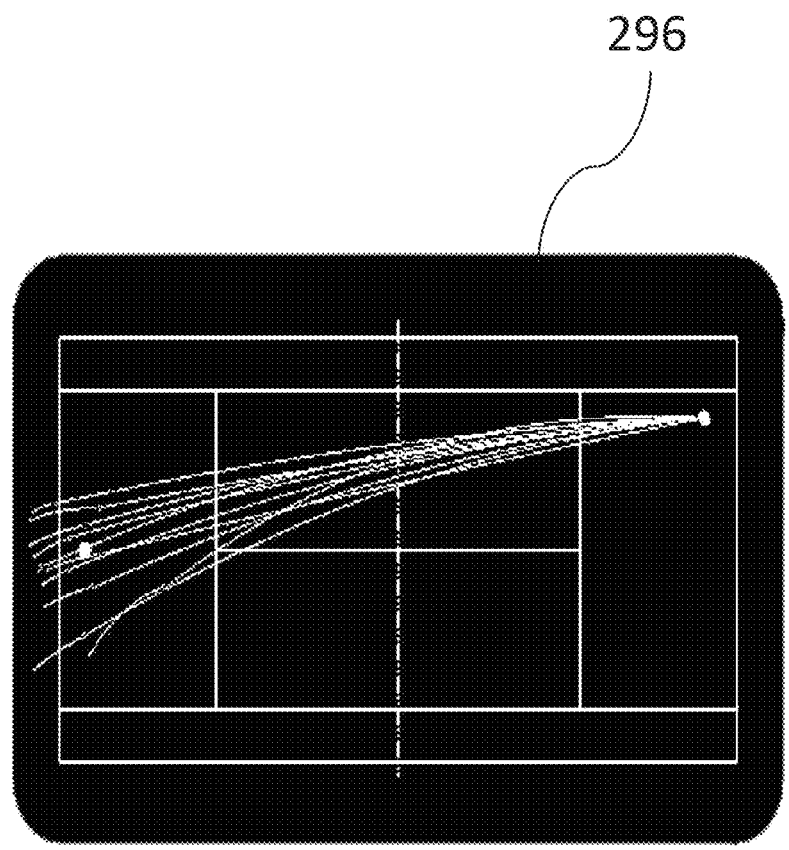
FIG. 13 illustrates a top view of a tennis court space.

Orientations of the objects, and associated properties of the objects are set within a space 296 and keyframes 295, as illustrated by FIGS. 11 and 13—keyframes denoting one projected image scene—defined by the alternate reality system 20, and at least one user sensor assembly disposed on an at least one user member worn sensor 290, the sensor assemblies operationally coupled to the at least one computer processor 829.

The representative alternate reality software system 270 further includes at least one data software system 276, the data software system 276 adapted to at least one or more of collect data, analyze data, and generate data associated with the alternate reality system 20.

The space 296 defined by the representative alternate reality system 20 has physical objects, virtual objects, and keyframes 295 therein associated with time, the space circumscribing the at least one user and an associated racket member used by the at least one user, the space having a plurality of points 297 derived along vertical, longitudinal, and latitudinal axes, the virtual objects therein having encoded properties representative of physical object counterparts of the virtual objects. The sensor reading software system 273 detecting from sensor assembly data 274 user vectors from at least one user and the associated racket, the user vectors defining space, time, object, trajectory, and derived change of the user and the associated racket therewith, the user vectors further including orientation of eye members of the user.

Figure 14:
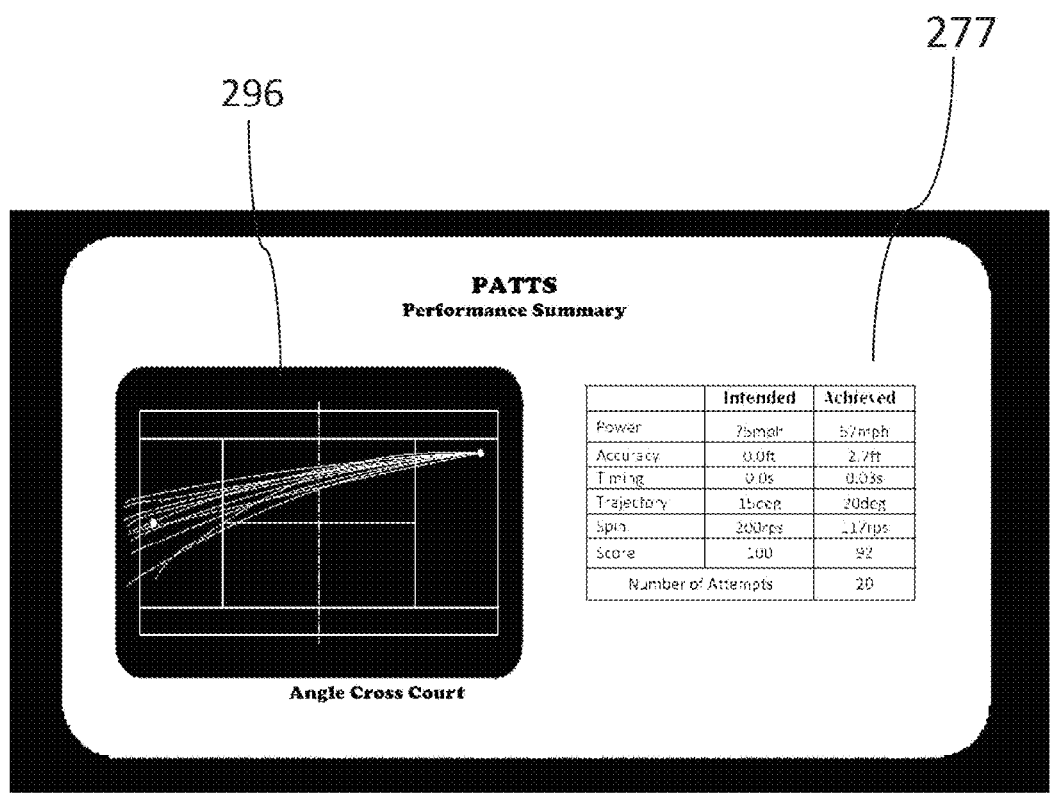
FIG. 14 illustrates statistical vectors associated with PATTSS (Power, Accuracy, Timing, Trajectory, Spin, Sweet spot.)

The sensor reading software system 273 further detects from sensor assembly data 274 ball member vectors 277, as illustrated by FIG. 14, defining space, time, object, trajectory, and derived change therewith of the ball member 130, the ball member vectors 277 including at least one or more from a group of: sweet spot defining where the ball member 130 lands on racket strings, accuracy 351 defining where the ball member 130 lands on a court, the spin defining for the ball member 130 at least rotations per minute, trajectory of the ball member 130 defining the pathway of ball member 130 flight, power determined from ball member 130 velocity, and timing associated with at least one or more of reciprocation of the rod and head assembly 100, 120 and at least one cue generated by the alternate reality software 271, the cue at least one or more of visual and audible. The alternate reality software system 270 calculates virtual ball member 131 action from at least a portion of the data generated by at least one or more of the at least one sensor assemblies from the group of internal optical sensors 230, light sensors 234, three-axis impact sensor assembly 240, flex sensors 260, perimeter sensors 289, worn sensors 290, digital cameras 281, external optical sensors 280, accelerometers 283, global positioning systems 284, gyroscopes 285, solid state compasses 286, pressure sensors 287, radio-frequency and identification tags 288, and external optical sensors 280 including the at least one or more of visible light spectrum sensors 282A and infrared sensors 282B, the infrared sensor 282B which may also be thermographic sensors 232C, the defined space 296 with physical and virtual objects therein, the encoded properties of the representative physical counterparts, virtual ball member vectors 277 originating from the ball member 130, the virtual ball member vectors 277 defining space, time, object, trajectory, and derived change therewith of the virtual ball member 131 and further defining object vectors, the object vectors defining within keyframes 295 the space, time, object, trajectory, and derived change therewith of virtual objects at least one or more of actively and passively reacting to at least one or more of the virtual ball member 131, the encoded properties of the virtual ball member 131, the at least one user, and the associated racket member of the at least one user.

A wireless network 400 is designed to transmit data to at least one or more of an at least one screen member 410 digital display 860, an at least one alternate reality wearable member 420, and an at least one computer display member 430 digital display, the wireless network 400 further adapted to transmit data from sensor assemblies, the wireless network 400 operationally coupled to at least one or more of the at least one computer processor 829 and the at least one or more of the at least one sensor assemblies from the group of internal optical sensors 230, light sensors 234, three-axis impact sensor assembly 240, flex sensors 260, external optical sensors 280, perimeter sensors 289, worn sensors 290, digital cameras 281, accelerometers 283, global positioning systems 284, gyroscopes 285, solid state compasses 286, pressure sensors 287, radio-frequency and identification tags 288, the optical sensors 230 including the at least one or more of visible light spectrum sensors 232A and infrared sensors 232B, the infrared sensor 232B which may also be thermographic sensors The at least one or more of the at least one screen member 410, the at least one or more of the alternate reality wearable member 420, and the at least one or more of the computer display member 430 are operationally coupled to the at least one computer processor 829, and further coupled to at least one or more of the at least one screen member 410, the at least one alternate reality wearable member 420, and the at least one computer display member 430, each adapted to display at least one or more of two-dimensional images, three-dimensional images, and statistical data for viewing by at least one or more of the user and at least one observer, the two-dimensional images, the three-dimensional images, and at least a portion of the statistical data.

Figure 20B:
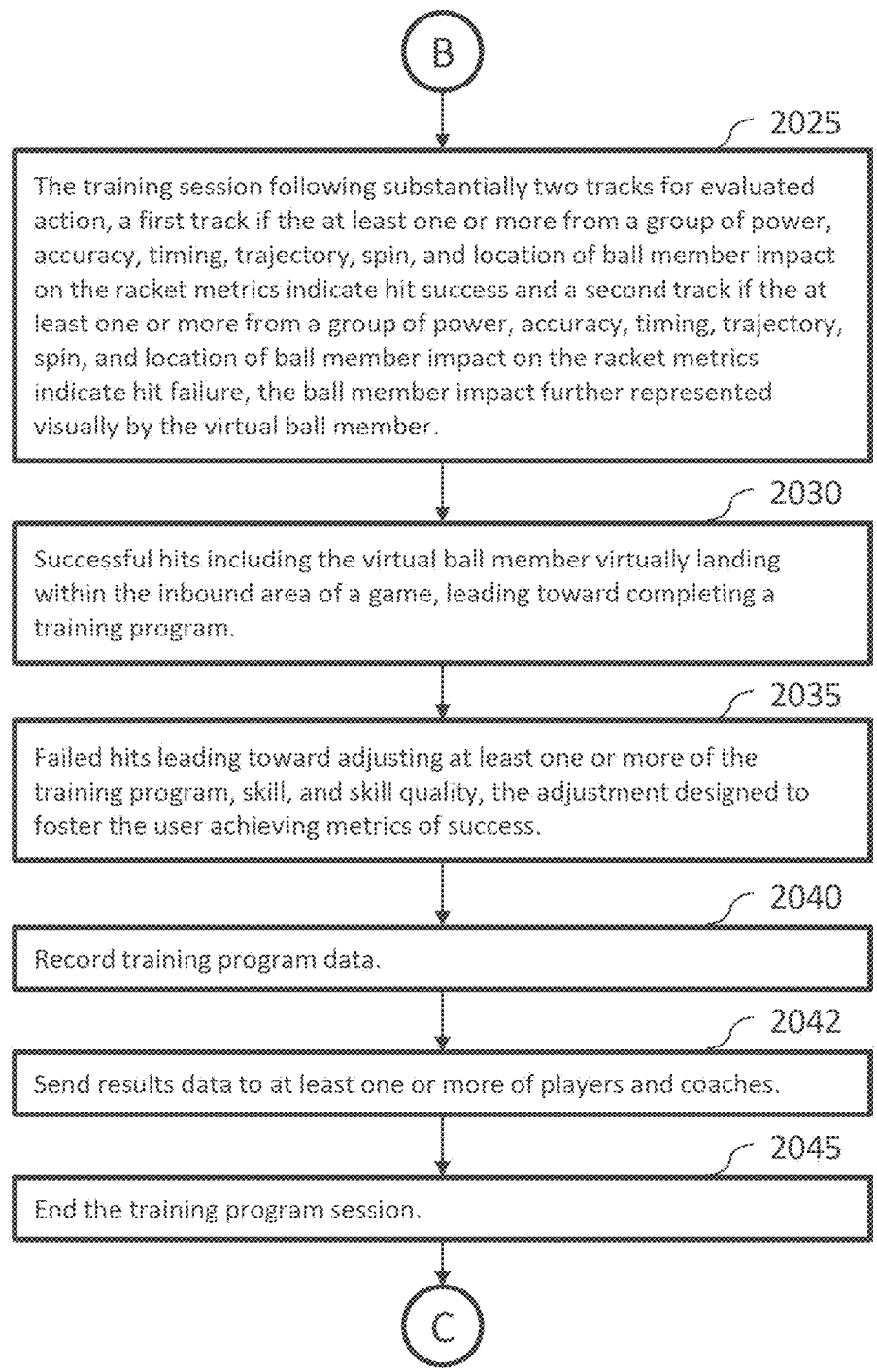
Figure 20C:
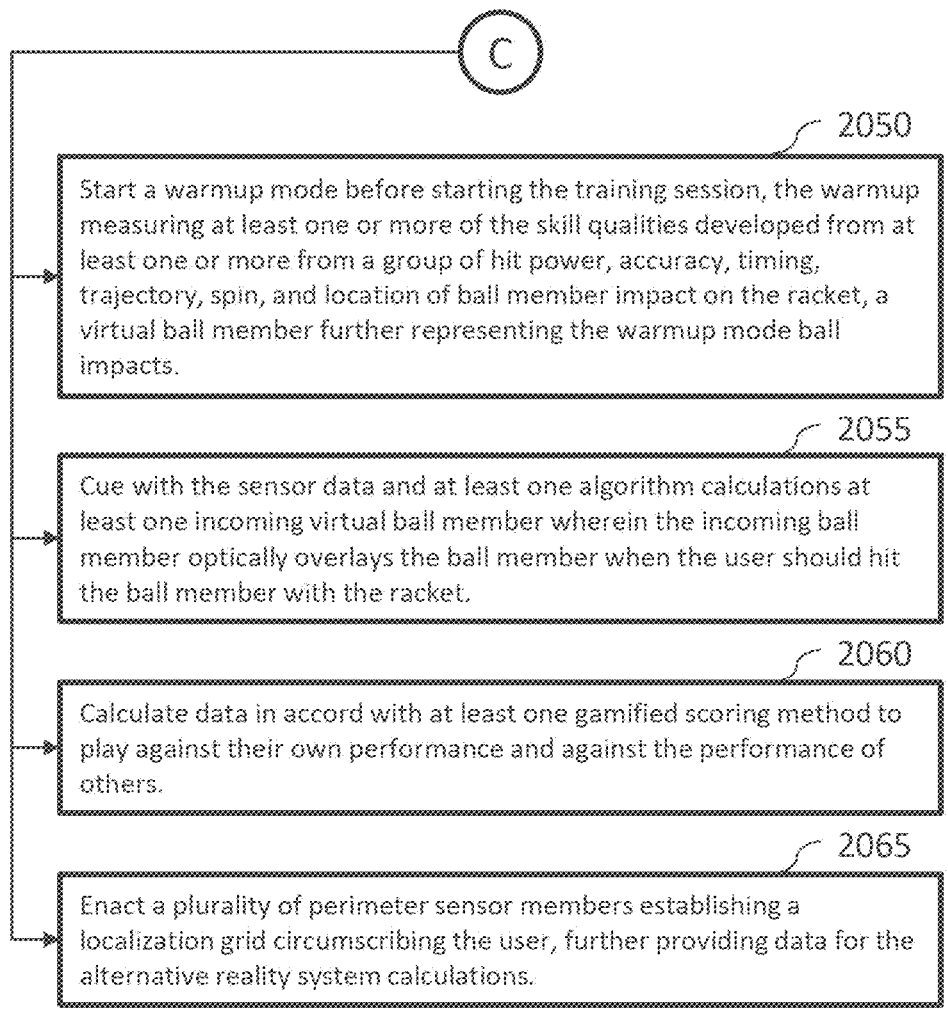

Included in FIG. 20 is a representative method 900 for using the alternate reality system 20. The alternate reality system 20 for a rod and head tennis ball training system assembly 10, in preferred embodiments, is synchronized with the oscillation 278 of the rod member 120 wherein the user times impact of the ball member 130 with synchronized cues from both the oscillation 278 of the rod member 120 and the alternate reality software system 270.

One representative embodiment of the inventive concept is an alternate reality training method for a ball sport including the step of 2000, selecting a training program from at least one computer system 800. The method further includes the step of 2005, selecting a skill from at least one or more from a group of time, repetition, ball speed, ball delivery, the skill quality developed from at least one or more from a group of power, accuracy, timing, trajectory, spin, and location of ball member 130 impact on a racket. The method further includes the step of 2010, selecting the start of a training session and beginning the training session. The method further includes the step of 2015, hitting with the racket a ball member 130 held by the head assembly, the success of each hit determined by the at least one optical sensor assembly 230, at least one three-axis impact sensor assembly, and at least one flex sensor assembly 260, the data from the sensor assemblies processed by the at least one computer program adapted to convert the data at least to represent a virtual ball member 131. The method further includes the step of 2020, the sensor data and at least one algorithm calculating at least one or more of racket hit power, accuracy, timing, trajectory, and spin delivered to the ball member 130 and racket impact location of the ball member 130, the calculations operationally conveyed to at least one or more of a virtual reality and an augmented reality system from at least one or more from a group of: screens, goggles, glasses, and contact lenses, wherein at least the user sees a virtual flight of an outgoing virtual ball member 131 after hitting the ball member 130 with the racket. The method further includes the step of 2025, the training session following substantially two tracks for evaluated action, a first track if the at least one or more from a group of power, accuracy, timing, trajectory, spin, and location of ball member 130 impact on the racket metrics indicate hit success and a second track if the at least one or more from a group of power, accuracy, timing, trajectory, spin, and location of ball member 130 impact on the racket metrics indicate hit failure, the ball member 130 impact further represented visually by the virtual ball member 131. The method further includes the step of 2030, successful hits including the virtual ball member 131 virtually landing within the inbound area of a game, leading toward completing a training program. The method further includes the step of 2035, failed hits leading toward adjusting at least one or more of the training program, skill, and skill quality, the adjustment designed to foster the user achieving metrics of success. The method further includes the step of 2040, recording training program data. The method further includes the step of 2070, sending results data 1850 to at least one or more of players and coaches. The method further includes the step of 2045, ending the training program session.

The method may further include the step of 2050, starting a warmup mode before starting the training session, the warmup measuring at least one or more of the skill qualities developed from at least one or more from a group of hit power, accuracy, timing, trajectory, spin, and location of ball member 130 impact on the racket, a virtual ball member 131 further representing the warmup mode ball impacts.

The method may further include the step of 2055, the sensor data and at least one algorithm calculations cuing an at least one incoming virtual ball member 131 wherein the incoming ball member 130 optically overlays the ball member 130 when the user should hit the ball member 130 with the racket.

The method may further include the step of 2060, calculating data in accord with at least one gamified scoring method for users to play against their own performance and against the performance of others.

The method may further include the step of 2065, enacting a plurality of perimeter sensor members 289 establishing a localization grid circumscribing the user, further providing data for the alternative reality system calculations.

The following patents are incorporated by reference in their entireties: Pat. Nos. CN110496377B, KR20190003925A, KR20190051930A, KR20200114936A, U.S. Pat. Nos. 6,416,327, 7,070,520, 7,169,067, 8,333,671, 8,905,855, 10,617,933, 10,646,767, 10,071,284, 10,369, 446, 11,052,320, US2008286733, US20130196794, US2021196133, US2021228965, WO2012091516A2, WO2020075878A1, and WO2020100137A1.

While the inventive concept has been described above in terms of specific embodiments, it is to be understood that the inventive concept is not limited to these disclosed embodiments. Upon reading the teachings of this disclosure many modifications and other embodiments of the inventive concept will come to mind of those skilled in the art to which this inventive concept pertains, and which are intended to be and are covered by both this disclosure and the appended claims. It is indeed intended that the scope of the inventive concept should be determined by proper interpretation and construction of the appended claims and their legal equivalents, as understood by those of skill in the art relying upon the disclosure in this specification and the attached drawings.

The invention claimed is:

1. An alternate reality training system for a ball sport comprising:

a head assembly, a stand assembly, and a vertical polymer flexible rod assembly connecting the substantially polymer head assembly to the stand assembly;

the vertical polymer flexible rod adapted to oscillate when a ball member coupled to the head assembly is hit by at least one or more of a racket, rod, bat, and paddle member;

at least one computer processor and user interface operable with a memory storage medium on which operates an alternate reality software system;

the alternate reality software system adapted to synchronize with oscillations to present substantially simultaneous cues for hitting the ball member coupled to the head member and convert associated data to a virtual ball member adapted to visually present data from hitting the physical ball member and associated user performance data to a screen assembly viewed by the user;

the user viewing the ball member within an alternate reality space from at least one or more from the group of: eyeglasses, heads-up-displays (HUD), contact lenses, virtual retinal displays, eye taps, and special augmented reality; and the computer processor adapted to record all inputs, calculate raw information, and provide real-time feedback via data and through the virtual ball member.

2. The alternate reality system for a ball sport of claim 1 wherein the alternate reality system software is synchronized with the oscillation of the rod member wherein the user times impact of the ball with synchronized cues from both the oscillation of the rod member and the alternate reality software system.

3. The alternate reality system for a ball sport of claim 1 wherein the virtual representation of incoming ball flight of the virtual ball member intercepts the ball member when the user should impact the ball member, the ball flight adapted for the user to practice given shots.

4. The alternate reality system for a ball sport of claim 1 wherein at least one user sensor assembly is disposed on an at least one user member, the at least one sensor assembly operationally coupled to the at least one computer processor and tracking the at least one user member within the alternate reality space.

5. The alternate reality system for a ball sport of claim 1 wherein a plurality of perimeter sensor members establishes a localization grid circumscribing the user, the localization grid further adapted to create at least part of the alternate reality space.

6. The alternate reality system for a ball sport of claim 1 wherein ball hit performance data is calculated from variables including the group from: sweet spot (landing area on racket strings), accuracy (landing area on court), ball spin (RPM), ball trajectory (height over net), power (MPH), and timing (balance), the variables used to calculate ball member motion and present that motion to a user via a virtual ball member, from the ball member motion calculating vectors defining space, time, object, trajectory, and derived change of the user and the associated racket therewith, the user vectors further including orientation of eye members of the user.

7. The alternate reality training method for a ball sport of claim 1, the method further including calculating data in accord with at least one gamified scoring method for users to play against their own performance and against the performance of others.

8. The alternate reality system for a ball sport of claim 1 wherein the ball member is a tennis ball and the virtual ball member represents a tennis ball.

9. The alternate reality system for a ball sport of claim 1 wherein sensors include at least one external optical sensor, perimeter sensor, and worn sensor, the worn sensors further allowing detection of the location, orientation, and trajectory of body parts to include at least one or more of head, legs, arms, hands, feet, and torso.

10. An alternate reality training method for a ball sport, the method comprising:

selecting a training program from at least one computer system;

selecting a skill from at least one or more from a group of time, repetition, ball speed, ball delivery, the skill quality developed from at least one or more from a group of power, accuracy, timing, trajectory, spin, and location of ball member impact on a racket;

selecting the start of a training session and beginning the training session;

hitting with the racket a ball member held by the head assembly, the success of each hit determined by the at least one optical sensor assembly, at least one three-axis impact sensor assembly, and at least one flex sensor assembly, the data from the sensor assemblies processed by the at least one computer program adapted to convert the data at least to represent a virtual ball member;

providing the sensor data and at least one algorithm for calculating at least one or more of racket hit power, accuracy, timing, trajectory, and spin delivered to the ball member and racket impact location of the ball member, the calculations operationally conveyed to at least one or more of a virtual reality and an augmented reality system from at least one or more from a group of: screens, goggles, glasses, and contact lenses, wherein at least the user sees a virtual flight of an outgoing virtual ball member after hitting the ball member with the racket;

following at the training session substantially two tracks for evaluated action, a first track if the at least one or more from a group of power, accuracy, timing, trajectory, spin, and location of ball member impact on the racket metrics indicate hit success and a second track if the at least one or more from a group of power, accuracy, timing, trajectory, spin, and location of ball member impact on the racket metrics indicate hit failure, the ball member impact further represented visually by the virtual ball member;

providing successful hits including the virtual ball member virtually landing within the inbound area of a game, leading toward completing a training program;

providing failed hits leading toward adjusting at least one or more of the training program, skill, and skill quality, the adjustment designed to foster the user achieving metrics of success;

recording training program data;

sending results data to at least one or more of players and coaches, and;

ending the training program session.

11. The alternate reality training method for a ball sport of claim 10, the method further including starting a warmup mode before starting the training session, the warmup measuring at least one or more of the skill qualities developed from at least one or more from a group of hit power, accuracy, timing, trajectory, spin, and location of ball member impact on the racket, a virtual ball member further representing the warmup mode ball impacts.

12. The alternate reality training method for a ball sport of claim 10, the method further including the sensor data and at least one algorithm calculations cuing an at least one incoming virtual ball member wherein the incoming ball member optically overlays the ball member when the user should hit the ball member with the racket.

13. The alternate reality training method for a ball sport of claim 10, the method further including calculating data in accord with at least one gamified scoring method for users to play against their own performance and against the performance of others.

14. The alternate reality training method for a ball sport of claim 10, the method further including enacting a plurality of perimeter sensor members establishing a localization grid circumscribing the user, further providing data for the alternative reality system calculations.

15. An alternate reality system for a ball sport comprising:

an at least one rod and head assembly for a ball member, the rod and head assembly having a plurality of sensor assemblies disposed thereon, the plurality of sensor assemblies adapted to detect at least one or more of impact on, impact location, acceleration, deceleration, and trajectory of at least one or more of the ball member, the head assembly, and the rod assembly, the ball member coupled to the head assembly and at least partially rotatable, sensor measurements for the rod assembly further including rod member flex and oscillation;

at least one computer processor and user interface operable with a memory storage medium on which operates an alternate reality software system, the alternate reality software system including an alternate reality software and at least one sensor reading software operably coupled to at least one sensor assembly of the alternate reality system and the plurality of sensor assemblies disposed on the rod and head assembly, the sensor assemblies including at least one or more from a group of: digital cameras, optical sensors, accelerometers, global positioning systems, gyroscopes, solid state compasses, pressure sensors, radio-frequency and identification tags, the optical sensors including at least one or more of visible light spectrum sensors, infrared sensors, and thermographic sensors detecting infrared light frequencies;

the alternate reality system including at least one or more of the plurality of sensor assemblies disposed on the rod and head assembly, at least one or more spatial sensor assemblies disposed to sense objects, orientations of the objects, and associated properties of the objects within a space and keyframes defined by the alternate reality system, the sensor assemblies operationally coupled to the at least one computer processor;

the alternate reality software system further including at least one data software system, the data software system adapted to at least one or more of collect data, analyze data, and generate data associated with the alternate reality system;

the space defined by the alternate reality system having physical objects, virtual objects, and keyframes therein associated with time, the space circumscribing the at least one user and an associated racket member used by the at least one user, the space having a plurality of points derived along vertical, longitudinal, and latitudinal axes, the virtual objects therein having encoded properties representative of physical object counterparts of the virtual objects;

the sensor reading software system detecting from sensor assembly data user vectors from at least one user and the associated racket, the user vectors defining space, time, object, trajectory, and derived change of the user and the associated racket therewith, the user vectors further including orientation of eye members of the user;

the sensor reading software system further detecting from sensor assembly data ball member vectors defining space, time, object, trajectory, and derived change therewith of the ball member, the ball member vectors including at least one or more from a group of: sweet spot defining where the ball member lands on racket strings, accuracy defining where the ball member lands on a court, the ball member spin defining for the ball member at least rotations per minute, trajectory of the ball member defining the pathway of ball member flight, power determined from ball member velocity, and timing associated with at least one or more of reciprocation of the rod and head assembly and at least one cue generated by the alternate reality software, the cue at least one or more of visual and audible;

the alternate reality software system calculating from at least a portion of the data generated by at least one of the at least one sensor assemblies the defined space with physical and virtual objects therein, the encoded properties of the representative physical counterparts, a virtual ball member vectors substantially originating from the ball member, the virtual ball member vectors defining space, time, object, trajectory, and derived change therewith of the virtual ball member and further defining object vectors, the object vectors defining within keyframes the space, time, object, trajectory, and derived change therewith of virtual objects at least one or more of actively and passively reacting to at least one or more of the virtual ball member, the encoded properties of the virtual ball member, the at least one user, and the associated racket member of the at least one user;

a wireless network adapted to transmit data to at least one or more of an at least one screen member, an at least one alternate reality wearable member, and an at least one computer display member, the wireless network further adapted to transmit data from sensor assemblies, the wireless network operationally coupled to at least one or more of the at least one computer processor and the at least one sensor assembly; and the at least one or more of the at least one screen member, the at least one alternate reality wearable member, and the at least one computer display member operationally coupled to the at least one computer processor, the at least one screen member, the at least one alternate reality wearable member, and the at least one computer display member adapted to display at least one or more of two-dimensional images, three-dimensional images, and statistical data for viewing by at least one or more of the user and an observer, the two-dimensional images, the three-dimensional images, and at least a portion of the statistical data.

16. The alternate reality system for a ball sport of claim 15 wherein the virtual representation of inbound ball flight of the virtual ball member intercepts the ball member when the user should impact the ball member, the ball flight adapted for the user to practice given shots.

17. The alternate reality system for a ball sport of claim 15 wherein the alternate reality system software is synchronized with the oscillation of the rod member wherein the user times impact of the ball with synchronized cues from both the oscillation of the rod member and the alternate reality software system.

18. The alternate reality system for a ball sport of claim 15 wherein at least one user sensor assembly is disposed on an at least one user member, the at least one sensor assembly operationally coupled to the at least one computer processor.

19. The alternate reality system for a ball sport of claim 15 wherein a plurality of perimeter sensor members establishes a localization grid circumscribing the user.

20. The alternate reality system for a ball sport of claim 15 wherein the ball member is a tennis ball and the virtual ball member represents a tennis ball.

* * * * *